(12) United States Patent
Teranishi et al.

(10) Patent No.: US 8,438,185 B2
(45) Date of Patent: May 7, 2013

(54) FILE STORAGE APPARATUS AND ACCESS CONTROL METHOD

(75) Inventors: Mika Teranishi, Ninomiya (JP); Hiroji Shibuya, Odawara (JP); Shunji Murayama, Hiratsuka (JP); Toshio Kimura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 12/996,145

(22) PCT Filed: Nov. 17, 2010

(86) PCT No.: PCT/JP2010/006748
§ 371 (c)(1),
(2), (4) Date: Dec. 3, 2010

(87) PCT Pub. No.: WO2012/066595
PCT Pub. Date: May 24, 2012

(65) Prior Publication Data
US 2012/0124092 A1    May 17, 2012

(51) Int. Cl.
*G06F 17/30*    (2006.01)

(52) U.S. Cl.
USPC .......................................................... 707/783

(58) Field of Classification Search ............... 707/783
See application file for complete search history.

(56) References Cited

U.S. PATENT DOCUMENTS

| | | | |
|---|---|---|---|
| 7,437,755 B2 * | 10/2008 | Farino et al. ...................... 726/5 |
| 8,245,141 B1 * | 8/2012 | Fuller et al. ..................... 715/741 |
| 2002/0147734 A1 * | 10/2002 | Shoup et al. .................. 707/200 |
| 2003/0140043 A1 * | 7/2003 | Hotchkiss et al. .............. 707/10 |
| 2006/0136516 A1 | 6/2006 | Jain et al. |
| 2006/0156020 A1 * | 7/2006 | Minium et al. ............... 713/182 |
| 2006/0218030 A1 * | 9/2006 | Ghosh et al. ...................... 705/8 |
| 2007/0180501 A1 | 8/2007 | Yadav et al. |

(Continued)

FOREIGN PATENT DOCUMENTS

| | | |
|---|---|---|
| JP | 2002-007195 | 1/2002 |
| WO | WO 2010100590 A1 * | 9/2010 |

OTHER PUBLICATIONS

Stefan Miltchev , Jonathan M. Smith , Vassilis Prevelakis , Angelos Keromytis , Sotiris Ioannidis, Decentralized access control in distributed file systems, ACM Computing Surveys (CSUR), v.40 n.3, p. 1-30, Aug. 2008.*

(Continued)

*Primary Examiner* — Debbie Le
*Assistant Examiner* — Richard Bowen
(74) *Attorney, Agent, or Firm* — Foley & Lardner LLP

(57) ABSTRACT

Proposed are a file storage apparatus and an access control method capable of facilitating the setting and change of an access right of a user for accessing a file.

A first account which only authorizes referral of all files and a second account which authorizes referral and editing of all files are defined in advance as accounts in a file system, and if a workspace unit receives an access request from a client for accessing a file and the access right in the workspace of the user for accessing the target file of the access request and the access right in the file system are different, the workspace unit requests the file system unit to perform the access processing to the file upon switching the account of the user to the first or second account.

8 Claims, 23 Drawing Sheets

U.S. PATENT DOCUMENTS

2008/0243992 A1 10/2008 Jardetzky et al.
2008/0320397 A1 12/2008 Do et al.
2009/0077087 A1* 3/2009 Urano et al. .................. 707/9
2009/0307604 A1 12/2009 Giles et al.
2009/0328071 A1* 12/2009 Vinokurov et al. ........... 719/318
2011/0087581 A1* 4/2011 Ram et al. ..................... 705/37

OTHER PUBLICATIONS

Eckstein, Robert, et al.; Using Samba, Chapters 1 and 6.2; 2000; pp. 10-30, 155-163; O'Reilly & Associates, Inc. USA.
PCT International Search Report and Written Opinion on application PCT/JP2010/006748 mailed May 18, 2011; 15 pages.

* cited by examiner

FIG.4

| USER NAME | AFFILIATED GROUP NAME | COMMENT |
|---|---|---|
| administrator | administrators | System Account |
| ... | ... | ... |
| search_admin | administrators | Search Engin System Account(Indexing) |
| ws_admin | administrators | WS System Account |
| ws_sys_read | Ws_service | WS System Account(Read only) |
| ws_sys_write | Ws_service | WS System Account(R/W) |
| ... | ... | ... |
| user0001 | Domainusers, sectionA | Common File Access User |
| user0002 | Domainusers, sectionB | Common File Access User |
| user0003 | Domainusers, sectionA | Common File Access User |

| FILE TITLE | FILE PATH | FILE ID | FILE SIZE | FILE TYPE | APPLICATION TYPE | FILE STRUCTURING TYPE |
|---|---|---|---|---|---|---|
| AAA.dox | /xx/xx/ | F1008 | 2,514KB | Doc | XXX | OOXML |
| BBB.xml | /ss/zz/ | F2126 | 3,527KB | Xml | YYY | XML |
| ... | ... | ... | ... | ... | ... | ... |
| 73A | 73B | 73C | 73D | 73E | 73F | 73G |

| ACCESS RIGHT | CREATION DATE AND TIME | UPDATE DATE AND TIME | ACCESS DATE AND TIME | CREATOR | OWNER | UPDATER |
|---|---|---|---|---|---|---|
| DomainUsers;R,sectionA:RW,administ | 2010/1/10 10:20 | 2010/1/31 10:55 | 2010/4/25 9:39 | user0001 | user0001 | User0001 |
| sectionB:RW,administrato | 2010/2/3 13:45 | 2010/2/4 18:03 | 2010/2/4 18:03 | user0002 | user0002 | user0021 |
| ... | ... | ... | ... | ... | ... | ... |
| 73H | 73I | 73J | 73K | 73L | 73M | 73N |

| FileID:1008 | STRUCTURING UNIT ID | CONTENT |
|---|---|---|
| FileTitle | F1008T | LET'S START FROM ABC |
| Page1 | F1008P001 | 1. AS YOUR FIRST FOREIGN LANGUAGE... WHICH ONE DO YOU WANT TO LEARN FIRST? WHEN DO YOU WANT TO START? 2. LET'S ARRANGED WORDS IN ALPHABETICAL ORDER... AMERICA, BRAZIL... |
| Chapter1 | F1008C001 | 1. WHAT FOREIGN LANGUAGE DO YOU WANT TO LEARN FIRST? WHEN DO YOU WANT TO START? |
| Para1 | F1008C001P001 | WHICH ONE DO YOU WANT TO LEARN FIRST? |
| Para2 | F1008C001P002 | WHEN DO YOU WANT TO START? |
| Chapter2 | F1008C002 | 2. LET'S ARRANGED WORDS IN ALPHABETICAL ORDER... AMERICA, BRAZIL, CANADA, DRINK, ECO... |
| Para1 | F1008C002P001 | AMERICA, BRAZIL, CANADA, DRINK, ECO....... |

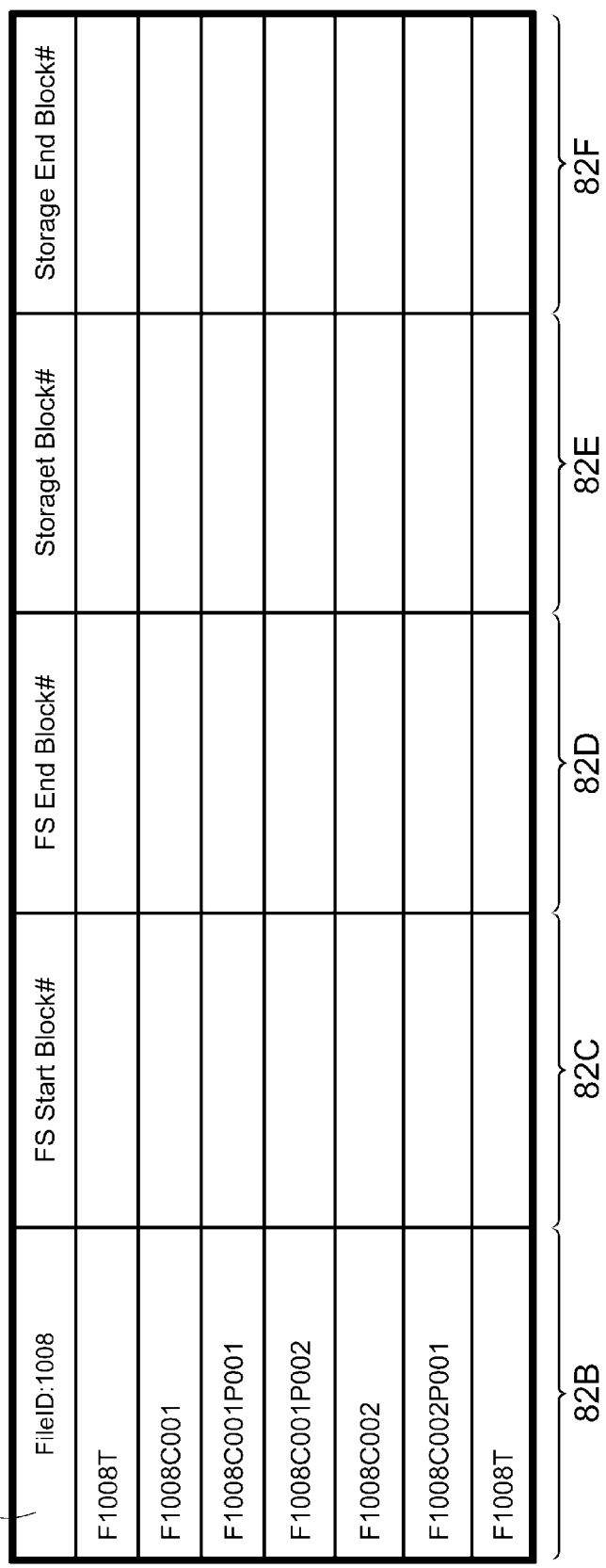

FIG.8

| Item<br>WS# | WS NAME | CREATION DATE | ADMINISTRATOR | COMMENT |
|---|---|---|---|---|
| WS001 | ProjectX | 2008/8/1 | WS_admin | Market Research |
| WS002 | ProjectY | 2009/9/20 | WS_admin | All Product Plan |
| WS003 | ProjectZ | 2010/4/1 | WS_admin, user003 | M&A Plan |
| ⋮ | ⋮ | ⋮ | ⋮ | ⋮ |
| 95A | 95B | 95C | 95D | 95E |

FIG.9

| UserID \ WS# | WS001 | WS002 | WS003 | ... |
|---|---|---|---|---|
| User001 | Allow | Allow | Disallow | ... |
| User002 | Allow | Disllow | Disallow | ... |
| User003 | Disallow | Disallow | Disallow | ... |
| ⋮ | ⋮ | ⋮ | ⋮ | ⋮ |

FIG.10

| WS# / FileID | WS001 | WS002 | WS003 | ... |
|---|---|---|---|---|
| F1008 | Use | Non | Use | ... |
| F1009 | Non | Use | Non | ... |
| F1008 | Use | Non | Use | ... |
| ⋮ | ⋮ | ⋮ | ⋮ | ⋮ |

| WS001 | User001 | User002 |
|---|---|---|
| F1008 | R/W | non |
| F1018 | non | R/W |
| F2010 | R/W | non |
| F2126 | R | non |

| WS file access ID code | WS SYSTEM ACCOUNT ASSIGNMENT ID | COMMENT |
|---|---|---|
| 0 | — | No change – User ID |
| 1 | ws_sys_read | WS System Account – Read Only |
| 2 | ws_sys_write | WS System Account – Write Allow |

FILE STORAGE APPARATUS AND ACCESS CONTROL METHOD

TECHNICAL FIELD

The present invention relates to a file storage apparatus and an access control method, and, for example, can be suitably applied to a NAS (Network Attached Storage) device.

BACKGROUND ART

Conventionally, with this type of file storage apparatus, an access right is set to folders and files by using an ACL (Access Control List) of a NAS OS (Operating System) or an FS (File System).

Meanwhile, in recent years, virtualization technology of creating a virtual workspace (hereinafter referred to as the "virtual workspace") in the file storage apparatus and providing this to the user has been put into practical application. With a file storage apparatus applying this kind of virtualization technology, the access right in the NAS OS/FS is carried over as the access right to the folders and shared files in the virtual workspace.

As a method of restricting access to a shared file, PTL 1 discloses an access control method of providing a plurality of access restriction information files to perform access control, and thereby enabling flexible access control as a result of simplifying the process and eliminating the need to re-login by switching the access restriction information file based on time, arbitrarily starting and ending the access restriction, and setting the target process to be an access restriction target/non-target.

CITATION LIST

Patent Literature

[PTL 1] Japanese Unexamined Patent Application Publication No. 2002-7195

SUMMARY OF INVENTION

Technical Problem

Meanwhile, with a file storage apparatus applying the foregoing virtualization technology, a virtual workspace is often created, for example, in units of projects or business divisions. Accordingly, with respect to the respective users who are authorized to access the virtual workspace, it is necessary to set an access right to the respective shared files of the respective users so that such users can similarly access all shared files that are used in that virtual workspace.

Nevertheless, since corporations and the like often, in some cases frequently, change the assigned projects and affiliated business divisions, and abolish or merge projects and business divisions, there is a problem in that it is difficult to set or change the access right to the respective shared files in accordance with the foregoing changes.

The present invention was devised in view of the foregoing points. Thus, an object of this invention is to propose a file storage apparatus and an access control method capable of facilitating the setting and change of a user's access right to a file.

Solution to Problem

In order to achieve the foregoing object, the present invention provides a file storage apparatus comprising a file system unit for providing a file system to a client, managing an access right in the file system of a user for accessing a file managed by the file system, and executing, in response to an access request from the client for accessing the file, access processing according to the access right in the file system for accessing the file assigned to the user using the client, and a workspace unit for providing a workspace to the client, and managing an access right in the workspace of the user for accessing the file to be used in the workspace that is set separately from the access right in the file system, wherein a first account which only authorizes referral of all files and a second account which authorizes referral and editing of all files are defined in advance as accounts in the file system, and wherein, in response to the access request from the client for accessing the file, if the access right in the workspace of the user for accessing the target file of the access request and the access right in the file system are different, the workspace unit requests the file system unit to perform the access processing to the file upon switching the account of the user to the first or second account.

The present invention additionally provides an access control method in a file storage apparatus, wherein the file storage apparatus includes a file system unit for providing a file system to a client, and a workspace unit for providing a workspace to the client, wherein the access control method comprises a first step of the file system unit managing an access right in the file system of the user for accessing a file managed by the file system, and the workspace unit managing an access right in the workspace of the user for accessing the file to be used in the workspace that is set separately from the access right in the file system, and a second step of the file system unit executing, upon receiving an access request from the client for accessing the file that was issued to the file system, access processing according to the access right in the file system for accessing the file assigned to the user using the client, wherein a first account which only authorizes referral of all files and a second account which authorizes referral and editing of all files are defined in advance as accounts in the file system, and wherein, at the second step, if the workspace unit receives the access request from the client for accessing the file and the access right in the workspace of the user for accessing the target file of the access request and the access right in the file system are different, the workspace unit requests the file system unit to perform the access processing to the file upon switching the account of the user to the first or second account.

According to the foregoing file storage apparatus and access control method, it is possible to set an access right in a workspace that is separate from an access right in a file system, and a user is able to access files within the range of one's access right in that workspace. Accordingly, merely by setting an access right in that workspace, an access right to a file used in the workspace of a user using such workspace can be easily set.

Advantageous Effects of Invention

According to the present invention, it is possible to facilitate the setting and change of the access right of the user for accessing the files.

BRIEF DESCRIPTION OF DRAWINGS

FIG. 4 is a conceptual diagram showing the configuration of the file system user account management table.

FIG. 5 is a conceptual diagram showing the configuration of the file basic information index table.

FIG. 6 is a conceptual diagram showing the configuration of the file structuring information table.

FIG. 7 is a conceptual diagram showing the configuration of the structured file block information management table.

FIG. 8 is a conceptual diagram showing the configuration of the workspace list table.

FIG. 9 is a conceptual diagram showing the configuration of the workspace access management table.

FIG. 10 is a conceptual diagram showing the configuration of the workspace file management table.

FIG. 11 is a conceptual diagram showing the configuration of the workspace file access management table.

FIG. 12 is a conceptual diagram showing the configuration of the workspace system account map.

DESCRIPTION OF EMBODIMENTS

An embodiment of the present invention is now explained in detail with reference to the attached drawings.

(1) Configuration of Computer System According to Present Embodiment

Figure 1:
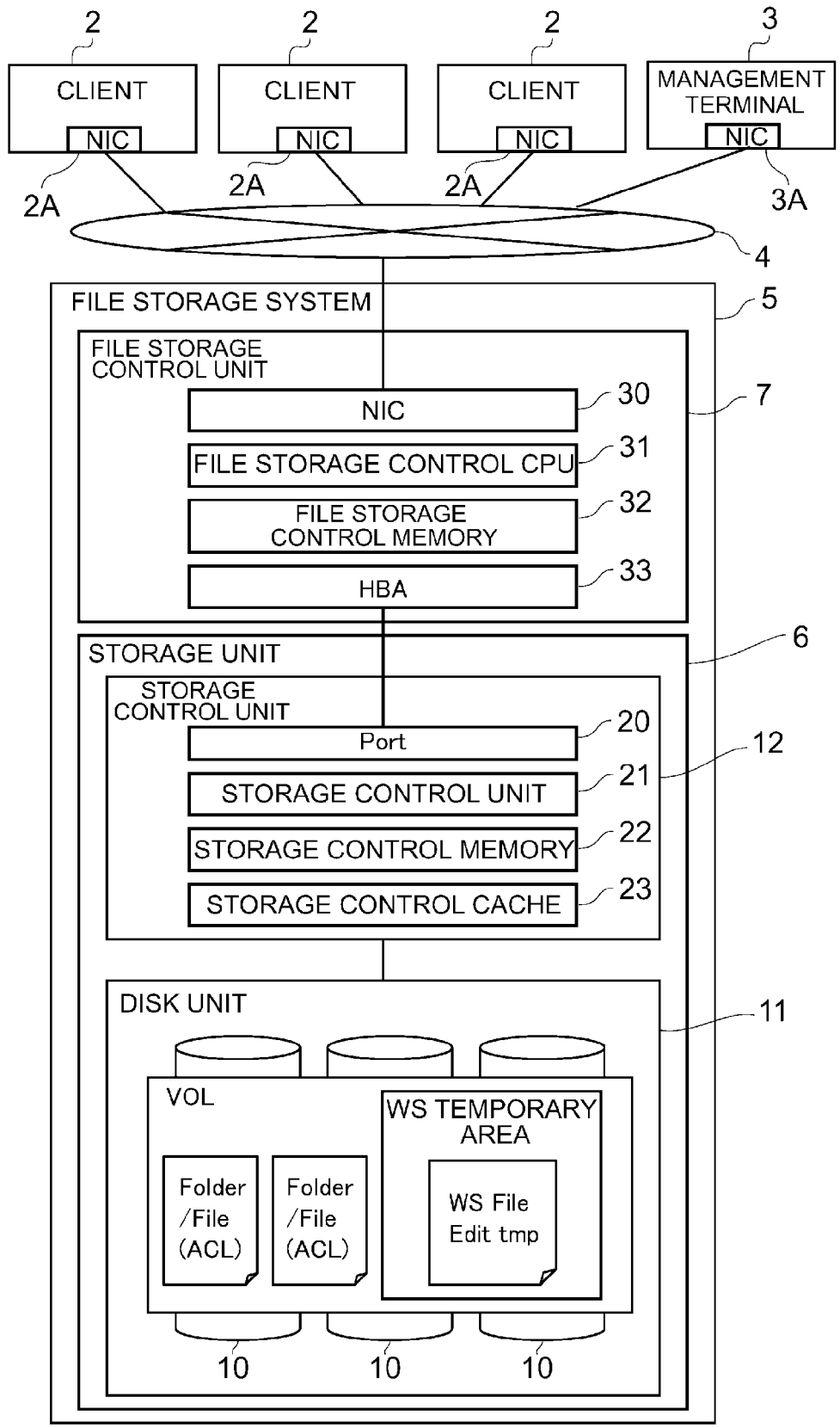
FIG. 1 is a block diagram showing the overall configuration of the computer system according to the present embodiment.

FIG. 1 shows the overall computer system 1 according to this embodiment. The computer system 1 is configured by a plurality of clients 2 and one management terminal 3 being connected to a file storage system 5 via a network 4 configured from a LAN (Local Area Network) or the like.

The client 2 is a computer device comprising information processing resources such as a processor and a memory and is configured, for example, from a personal computer, a workstation, a mainframe or the like. The client 2 comprises an input device such as a keyboard, a switch, a pointing device and/or a microphone, and an output device such as a monitor display and/or a speaker, and is connected to the network 4 via an NIC (Network Interface Card) 2A.

The management terminal 3 is a computer device comprising information processing resources such as a processor and a memory and is configured, for example, from a personal computer, a workstation, a mainframe or the like. The management terminal 3 is used for the maintenance and management of the computer system 1, and is connected to the network 4 via an NIC 3A.

The file storage system 5 comprises a storage unit 6 configured from a disk array device or the like, and a file storage control unit 7 for providing a file sharing service to the client 2.

The storage unit 6 comprises a disk unit 11 configured from one or more disk devices 10, and a storage control unit 12 for controlling the reading and writing of data from and to the disk unit 11.

The disk devices 10 of the disk unit 11 are configured, for example, from an expensive disk drive such as a SCSI (Small Computer System Interface) disk, or an inexpensive disk device such as a SATA (Serial AT Attachment) disk or an optical disk.

A RAID (Redundant Arrays of Independent Disks) group is configured from one or more disk devices 10, and one or more logical volumes VOL are set in a physical storage area provided by the respective disk devices 10 configuring one RAID group. File data provided to the client 2 is read and written in units of a block of a predetermined size (this is hereinafter referred to as the "logical block") in the logical volume.

A unique identifier (this is hereinafter referred to as the "LUN (Logical Unit Number)") is assigned to each of the logical volumes VOL. In the case of this embodiment, the input and output of data is performed by combining the LUN and the identification number (LBA: Logical Block Address) that is assigned to each of the logical blocks as the address, and designating such address.

Meanwhile, the storage control unit 12 comprises a storage control CPU (Central Processing Unit) 21, a storage control memory 22 and a storage control cache 23, and is connected to the file storage control unit 7 via a port 20.

The storage control CPU 21 is a processor that governs the operational control of the overall storage unit 6. The storage control memory 22 stores various programs, and is also used as a work memory of the storage control CPU 21. Various types of processing such as data I/O processing are performed as a result of the storage control CPU 21 executing the programs stored in the storage control memory 22. Moreover, the storage control cache 23 is used for temporarily storing data to be read and written from and to the disk devices 10 of the disk unit 11.

The file storage control unit 7 comprises a file storage control CPU 31 and a file storage control memory 32, and is connected to the network 4 via an NIC (Network Interface Card) 30, and also connected to the storage unit 6 via an HBA (Host Bus Adapter) 33.

The file storage control CPU 31 is a processor that governs the operational control of the overall file storage control unit 7. The file storage control memory 32 is used for storing various programs such as the file system program, and is also used as a work memory of the file storage control CPU 31. The file sharing service to the client 2 is provided as a result of the file storage control CPU 31 executing the file system program stored in the file storage control memory 32.

In reality, the file storage control CPU 31 write file data in the corresponding disk device 10 in the disk unit 11 by transferring such file data of the write target file sent from the client 2 to the storage unit 6 based on the file system program on one hand, and manages the writing location of such file in the disk unit 11 in logical block units.

If a file read request is thereafter provided from the client 2, the file storage control CPU 31 sends a read request to the storage unit 6 to cause the storage unit 6 to read the corresponding file data from the respective logical blocks storing the file data of the relevant file, and then sends the thus obtained file data of that file to the client 2.

Figure 2:
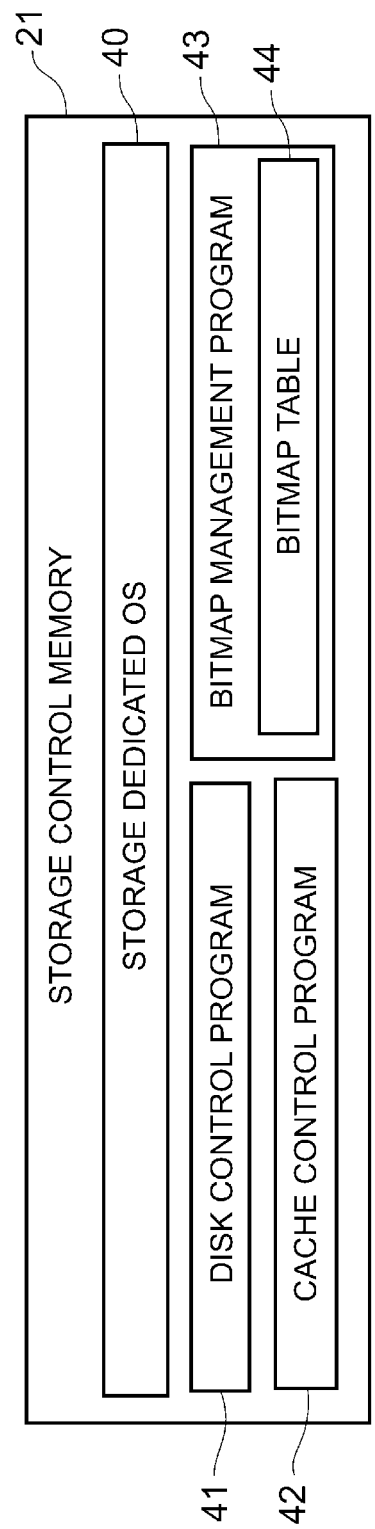
FIG. 2 is a block diagram showing the program configuration in the storage control memory.

FIG. 2 shows the program configuration in the storage control memory 21 of the storage unit 6 of the file storage system 5. As shown in FIG. 2, the storage control memory 21 stores, as control programs, a storage dedicated OS (Operating System) 40, a disk control program 41, a cache control program 42 and a bitmap management program 43.

The storage dedicated OS 40 is an OS for the storage unit 6, and the disk control program 41, the cache control program 42 and the bitmap management program 43 run on the storage dedicated OS 40.

The disk control program 41 is a program for controlling the input and output of data to and from the disk unit 11. The storage control CPU 21 reads and writes file data requested from the client 2 from and to the corresponding disk device 10 in the disk unit 11 according to the disk control program 41 based on a command issued from the file storage control unit 7.

The cache control program 42 is a program for controlling the input and output of data to and from the storage control cache 23. The storage control CPU 21 controls the input and output of data to and from the storage control cache 23 based on the disk control program 41.

The bitmap management program 43 comprises a bitmap table 44, and uses the bitmap table 44 to manage the location of the logical blocks storing the respective file data in the disk unit 11.

Figure 3:
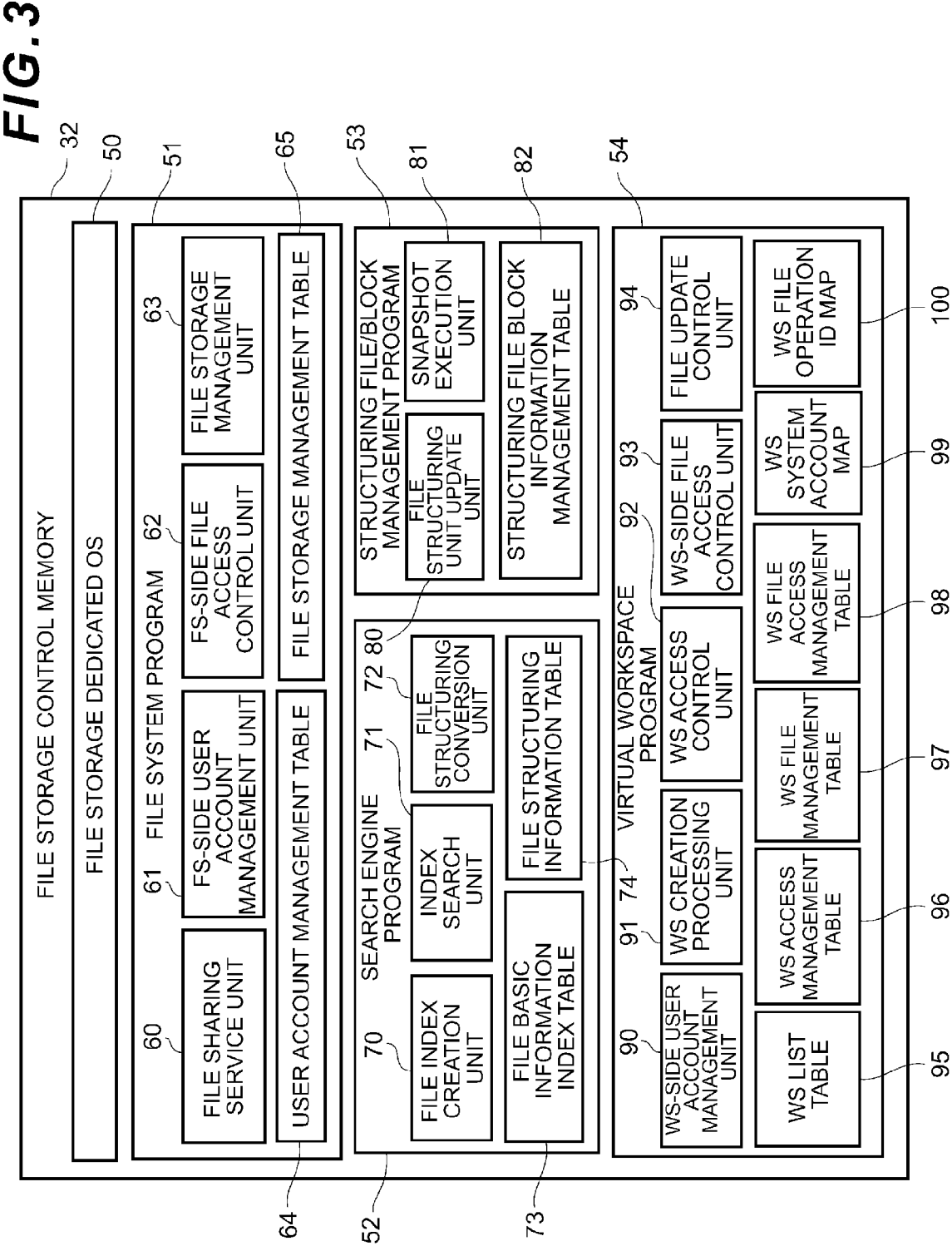
FIG. 3 is a block diagram showing the program configuration in the file storage control memory.

Meanwhile, FIG. 3 shows the program configuration in the file storage control memory 31 of the file storage control unit 7 of the file storage system 5. As shown in FIG. 3, the file storage control memory 31 stores a file storage dedicated OS 50, a file system program 51, a search engine program 52, a structured file/block management program 53 and a virtual workspace program 54.

The file storage dedicated OS 50 is an OS for the file storage system 5, and the file system program 51, the search engine program 52, the structured file/block management program 53 and the virtual workspace program 54 run on the file storage dedicated OS 50.

The file system program 51 is a program for providing a file sharing service to the client 2, and is configured from program modules such as a file sharing service unit 60, a file system-side user account management unit 61, a file system-side file access control unit 62 and a file storage management unit 63, and management tables such as a user account management table 64 and a file storage management table 65.

The file sharing service unit 60 is a program module for reading and writing data from and to the storage unit 6 in file units according to a request from the client 2, and the file system-side user account management unit 61 is a program module for managing the user account of users who are authorized to use the file system provided by the file sharing service unit 60.

The file system-side file access control unit 62 is a program module for controlling the access from users to the file system. The access right of the respective users for accessing the respective files is also managed by the file access control unit 62. The file storage management unit 63 is a program module for managing where in the disk unit 11 of the storage unit 6 the file data of the respective file is stored.

The user account management table 64 is a table that is used for managing the user account of the respective users who are authorized to use the file system provided by the file sharing service unit 60. The user account management table 64 is configured, as shown in FIG. 4, from a user name column 64A, an affiliated group name column 64B and a comment column 64C.

The user name column 64A stores the user name of the users who are authorized to use the file system, and the affiliated group name column 64B stores the group name ("administrators", "WS_service" and the like) of the group to which that user belongs. The comment column 64C stores a brief comment concerning that user.

The file storage management table 65 is a table that is used by the file storage management unit 63 for managing where the respective files managed by the file system are stored. The file storage management table 65 stores the storage location of the respective files managed by the file system. Note that details regarding the file storage management table are omitted.

The search engine program 52 (FIG. 3) is a program for respectively creating and managing the index of the respective files managed by the file system, and searching for the relevant file based on the index of the respective files that is being managed, and is configured from program modules such as a file index creation unit 70, an index search unit 71 and a file structuring conversion unit 72, and management tables such as a file basic information index table 73 and a file structuring information table 74.

The file index creation unit 70 is a program module for creating the index of the respective files managed by the file system, and the index search unit 71 is a program module for searching for the relevant file based on the index created by the file index creation unit 70. The file structuring conversion unit 72 is a program module for segmentalizing, as described later, the respective files into a plurality of structuring parts (hereinafter referred to as the "structuring units") according to the respective contents thereof.

The file basic information index table 73 is a table that is used for managing the index of the respective files managed by the file system, and is created and managed by the file index creation unit 70. The file basic information index table 73 is configured, as shown in FIG. 5, a file title column 73A, a file path column 73B, a file ID column 73C, a file size column 73D, a file type column 73E, an application type column 73F, a file structuring type column 73G, an access right column 73H, a creation date and time column 73I, an update date and time column 73J, an access date and time column 73K, a creator column 73L, an owner column 73M and an updater column 73N.

The file title column 73A stores the file title of the corresponding file, and the file path column 73B stores the path to that file. The file ID column 73C stores the identifier (file ID) in the file system that is assigned to that file, and the file size column 73D stores the file size of that file.

The file type column 73E stores the type of that file, and the application type column 73F stores the type of application that is required for reading and writing that file. The file structuring type column 73G stores the structuring type (file format) of that file, and the access right column 73H stores the access right that is set to that file.

The creation date and time column 73I, the update date and time column 73J and the access date and time column 73K respectively store the creation date and time, the update date and time and the last access date and time of the file, and the creator column 73L, the owner column 73M or the updater column 73N respectively store the user name of the creator, the owner or the last updater of the file.

The file structuring information table 74 is a table that is used for managing the structure of the respective files that were segmentalized into a plurality of structuring units by the file structuring conversion unit 72, and is created for each file. The file structuring information table 74 is configured, as shown in FIG. 6, from a target file ID column A, a structuring unit column 74B, a structuring unit ID column 47C and a contents column 74D.

The target file ID column 74A stores the file ID of the target file of the file structuring information table 74, and the structuring unit column 74B stores the name of the individual structuring units obtained by segmentalizing the file according to its contents. Note that, in the case of this embodiment, as the "structuring units" there are a file title ("File Title"), a page ("Page"), a chapter ("Chapter") and a paragraph ("Paragraph"). In the foregoing case, a file is divided into a file title and the respective pages, the respective pages are divided for each chapter, and the chapter is divided for each paragraph. The structuring unit ID column 74C stores the ID (structuring unit ID) assigned to the corresponding structuring unit, and the specific contents of that structuring unit.

Meanwhile, the structured file/block management program 53 (FIG. 3) is a program for managing the storage location of each structuring unit of the respective files that were segmentalized into a plurality of structuring units by the file structuring conversion unit 72 of the search engine program 52, and is configured from program modules such as a file structuring unit update unit 80 and a snapshot execution unit 81, and tables such as a structured file block information management table 82.

The file structuring unit update unit 80 is a program module for reflecting, when a file is updated, the update contents thereof in the file data of that file for each structuring unit, and the snapshot execution unit 81 is a program module for creating a snapshot as a still data image of the file as needed.

The structured file block information management table 82 is a table that is used for managing the storage location of each structuring unit of the respective files that are segmentalized as described above, and is created for each file. The structured file block information management table 82 is configured, as shown in FIG. 7, a target file ID column 82A, a structuring unit ID column 82B, a file system start block number column 82C, a file system end block number column 82D, a storage start block number column 82E and a storage end block number column 82F.

The target file ID column 82A stores the file ID of the target file of the structured file block information management table 82, and the structuring unit ID column 82B and stores the structuring ID of the respective structuring units in that file.

The file system start block number column 82C and the file system end block number column 82D respectively store the block number of the start block or the block number of the end block of the storage area storing the data of the corresponding structuring unit that is managed by the file system, and the storage start block number column 82E and the storage end block number column 82F respectively store the block number of the start block or the block number of the end block of the storage area storing the data of the corresponding structuring unit that is managed by the storage unit 6 (FIG. 1).

Meanwhile, the virtual workspace program 54 (FIG. 3) is a program for creating and managing the virtual workspace provided by the file storage system 5 to the client 2, and is configured from program modules such as a workspace-side user account management unit 90, a workspace creation processing unit 91, a workspace access control unit 92, a workspace-side file access control unit 93 and a file update control unit 94, and management information such as a workspace list table 95, a workspace access management table 96, a workspace file management table 97, a workspace file access management table 98, a workspace system account map 99 and a workspace file operation ID map 100.

The workspace-side user account management unit 90 is a program module for managing the user account of the users who are authorized to use the respective virtual workspaces created in the file storage system 5. The workspace creation processing unit 91 is a program module for creating a new virtual workspace according to a request from the user, and the workspace access control unit 92 is a program module for controlling the user access to the virtual workspace. The workspace-side file access control unit 93 is a program module for controlling the user access to the files that are used in the virtual workspace, and the file update control unit 94 is a program module for updating a file according to a request from the user.

The workspace list table 95 is a table that is used for managing the virtual workspace created in the file storage system 5 and is configured, as shown in FIG. 8, from a workspace number column 95A, a workspace name column 95B, a creation date column 95C, an administrator column 95D and a comment column 95E.

The workspace number column 95A stores the identifier (workspace number) assigned to the corresponding virtual workspace, and the workspace number column 95B stores the name (workspace number) of that virtual workspace. The creation date column 95C stores the date that the virtual workspace was created, and the administrator column 95D stores the user name of the administrator of that virtual workspace. The comment column 95E stores a comment concerning that virtual workspace that is input during the creation of that virtual workspace.

The workspace access management table 96 is a table based on a time table format that is used by the workspace access control unit 92 (FIG. 3) for managing the users who are authorized to use that virtual workspace regarding the respective virtual workspaces created in the file storage system 5 and is configured, as shown in FIG. 9, from a user name column 96A, a workspace number column 96B and an accessibility column 96C.

The user name column 96A stores the user name of all users who are authorized to use the file system, and the workspace number column 96B stores the workspace number of all virtual workspaces created in that file system. The accessibility column 96C stores information representing whether the corresponding user is authorized to use the corresponding virtual workspace. Specifically, the accessibility column 96C stores "Allow" if the corresponding user is authorized to use the corresponding virtual workspace, and stores "Disallow" if that user is not authorized to use that virtual workspace.

The workspace file management table 97 is a table based on a time table format that is used by the workspace-side file access control unit 93 for managing which file is being used in which virtual workspace and is configured, as shown in FIG. 10, from a file ID column 97A, a workspace number column 97B and a use/non-use column 97C.

The file ID column 97A stores the file ID of all files managed by the file system, and the workspace number column 97B stores the workspace number of all virtual workspaces created in that file system. The use/non-use column 97C stores information representing whether the corresponding file is being used in the corresponding virtual workspace.

Specifically, the use/non-use column 97C stores "Use" if the corresponding file is being used in the corresponding virtual workspace, and stores "Non" if that file is not being used in that virtual workspace.

The workspace file access management table 98 is a table based on a time table format that is used by the workspace-side file access control unit 93 for managing the default access right of each user for accessing the respective files in the virtual workspace, and is created for each virtual workspace. The workspace file access management table 98 is configured, as shown in FIG. 11, from a workspace number column 98A, a file title column 98B, a user name column 98C and an access right column 98D.

The workspace number column 98A stores the workspace number of the virtual workspace to which that workspace file access management table 98 is associated. The file ID column 98B stores the file ID of all files that are being used in that virtual workspace, and the user ID column 98C stores the user ID of all users who are authorized to use that virtual workspace.

The access right column 98D stores the type of default access right assigned to the corresponding user for accessing the corresponding file. Note that, as the type of access right, there are a read right ("R") for which only referral (read) is authorized, a read/write right ("R/W") for which referral and editing (write) are authorized. If the corresponding user is not authorized to refer to or edit the corresponding file, "non" is stored in the corresponding access right column 98D.

The workspace system account map 99 is a map that is used for managing the correspondence relation of the workspace file access ID code and the system account of the virtual workspace and is configured, as shown in FIG. 12, from a workspace file access ID code column 99A, a workspace system account assignment ID column 99B and a comment column 99C.

The workspace file access ID code column 99A stores the workspace file access ID code from "0" to "2", and the workspace system account assignment ID column 99B stores the system account of the virtual workspace (hereinafter referred to as the "virtual workspace system account") associated with that workspace file access ID code. The comment column 99C stores a comment regarding the corresponding workspace file access ID code.

The details and significance of the "workspace file access ID code" and the "virtual workspace system account" will be described later.

Figure 13:
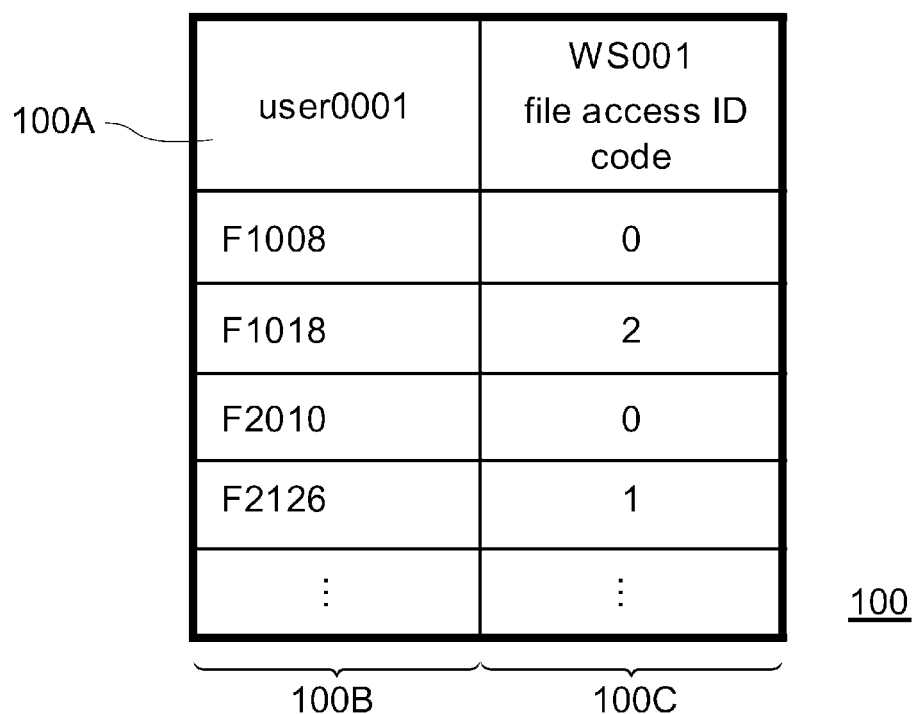
FIG. 13 is a conceptual diagram showing the configuration of the workspace file operation ID map.

The workspace file operation ID map 100 is a map for managing the access right in the virtual workspace for accessing the individual files set for the corresponding user, and is created for each user. The workspace file operation ID map is configured, as shown in FIG. 13, from a target user name column 100A, a file ID column 100B and a workspace file access ID code column 100C.

The target user ID column 100A stores the user name of the target user of the workspace file operation ID map 100, and the file ID column 100B stores the file ID of all files managed by the file system. The workspace file access ID code column 100C stores the workspace file access ID code corresponding to the access right set to the corresponding file.

(2) File Access Control Method in Computer System

The file access control method according to the present embodiment adopted by the file storage system 5 is now explained.

Figure 14:
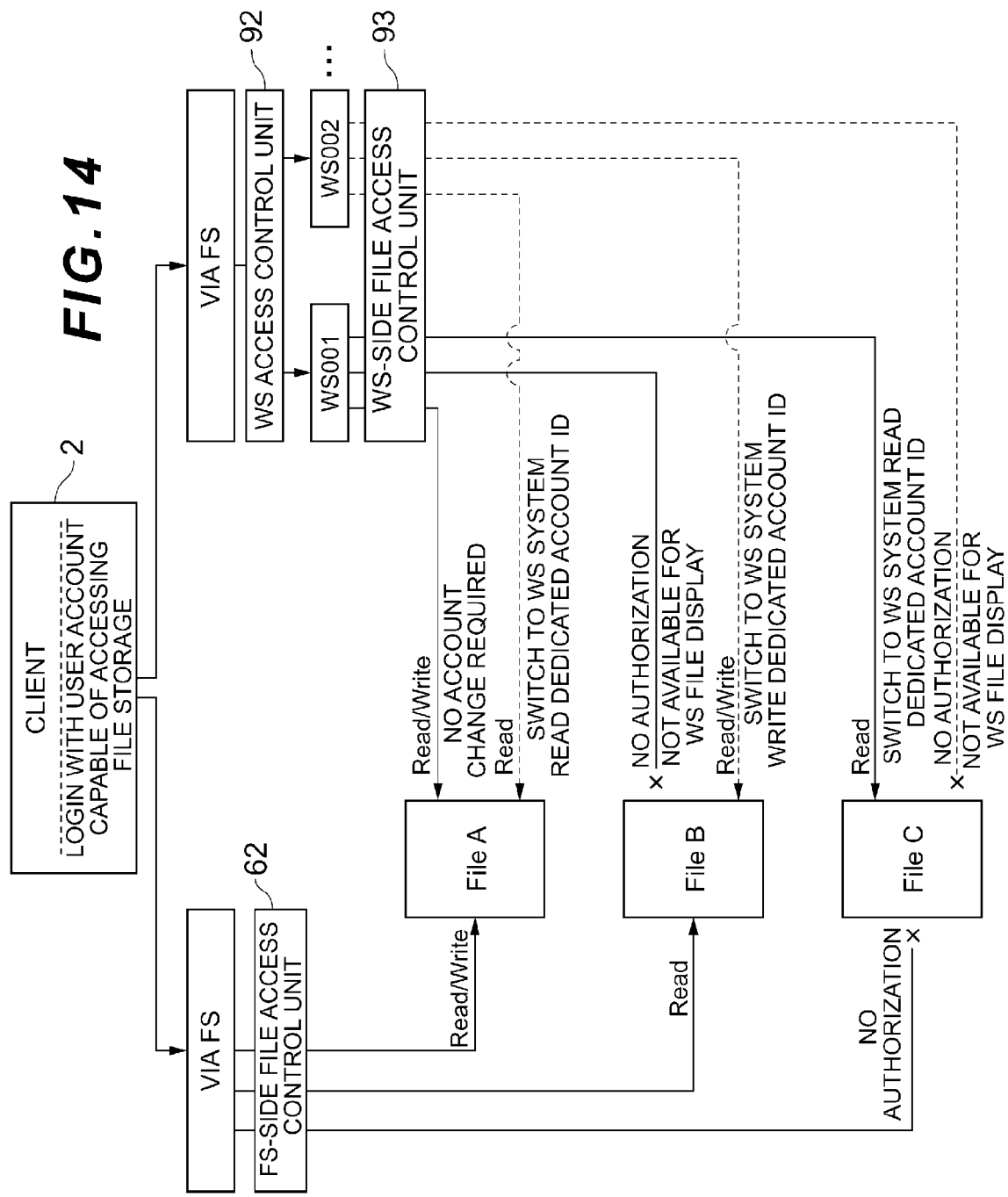
FIG. 14 is a conceptual diagram explaining the outline of the file access control method according to the present embodiment.

In the case of this embodiment, as shown in FIG. 14, the user is able to directly access, via the file system, the respective files managed by the file system of the file storage system 5, or access the same via the virtual workspace. In the foregoing case, the present embodiment is characterized in that the access right in the file system of the user for accessing the respective files and the access right in the virtual workspace can be set individually.

Thus, there may be cases where the access right in the file system of a certain user for accessing a certain file is different from the access right in the virtual workspace. In the foregoing case, if that user attempts to access that file via the virtual workspace, that user is only able to access that file within the range of the access right (referral only, or referral and editing) in the file system that is assigned to that user. This is because the file system denies the access request that exceeds the access authority in the file system.

Thus, in this embodiment, as the user accounts in the file system, a system account of "ws_sys_read" as an account that authorizes only referral regarding all files in the file system and a system account of "ws_sys_write" which authorizes referral and editing of all files in the file system are prepared in advance as shown in FIG. 4 (refer to FIG. 4).

If the user attempts to access, via the virtual workspace, a file in which the access right in the file system and the access right in the virtual workspace are different, the present embodiment is also characterized in that the access processing (read processing or write processing) to that file is succeeded from the virtual workspace program 54 (FIG. 3) to the file system program 51 (FIG. 3) upon switching the account of that user to the system account ("ws_sys_read" or "ws_sys_write") of the access right in the file system that is the same as the access right in the virtual workspace.

Consequently, according to the file access control method of the present embodiment, the user is able to access the intended files within the range that is authorized to such user according to the access right in the workspace without being affected by the access right in the file system.

The workspace system account map 99 described above with reference to FIG. 12 is a map for managing the correspondence relation of the system account ("ws_sys_read" or "ws_sys_write") to become the switching destination of the user account and the workspace file access ID code in cases where a user attempts to access, via the virtual workspace, a file in which the access right in the file system and the access right in the virtual workspace are different.

In the case of this embodiment, a workspace file access ID code of "1" is assigned to the system account of "ws_sys_read", and a workspace file access ID code of "2" is assigned to the system account of "ws_sys_write".

Moreover, the workspace file operation ID map 100 described above with reference to FIG. 13 is a map that is used for managing the correspondence relation of the respective files that are being used in the virtual workspace and the workspace file access ID code.

Accordingly, when referring to FIG. 13, for example, with respect to the user indicated as "uesr1", since a workspace file access ID code of "2" is associated with a file indicated as "F1018" in the workspace of "WS 001", and, upon referring to FIG. 12, the workspace file access ID code of "2" is associated with the account of "ws_sys_write", the access processing to that file is succeeded from the virtual workspace program 54 (FIG. 3) to the file system program 51 (FIG. 3) upon switching the user account to the account of "ws_sys_write" upon that user accessing that file via the virtual workspace.

Note that, if the access right in the virtual workspace and the access right in the file system for accessing a certain file are the same, there is no need to switch the user account, that account may be used as is in the file system. Thus, "0" is applied as the workspace file access ID code in the foregoing state.

Specifically, in FIG. 13, with respect to the files in which "0" is stored in the workspace file access ID code column 100C, the access processing to that file is succeeded from the virtual workspace program 54 (FIG. 3) to the file system program 51 (FIG. 3) without any change to the user account.

The specific contents of the various types of processing concerning the file access control method according to the present embodiment are now explained. Although the processing subject of the various types of processing is explained as a "program module" below, in reality, it goes without saying that the file storage control CPU 32 executes the processing based on that "program module".

(2-1) Virtual Workspace Creation Processing

Figure 15:
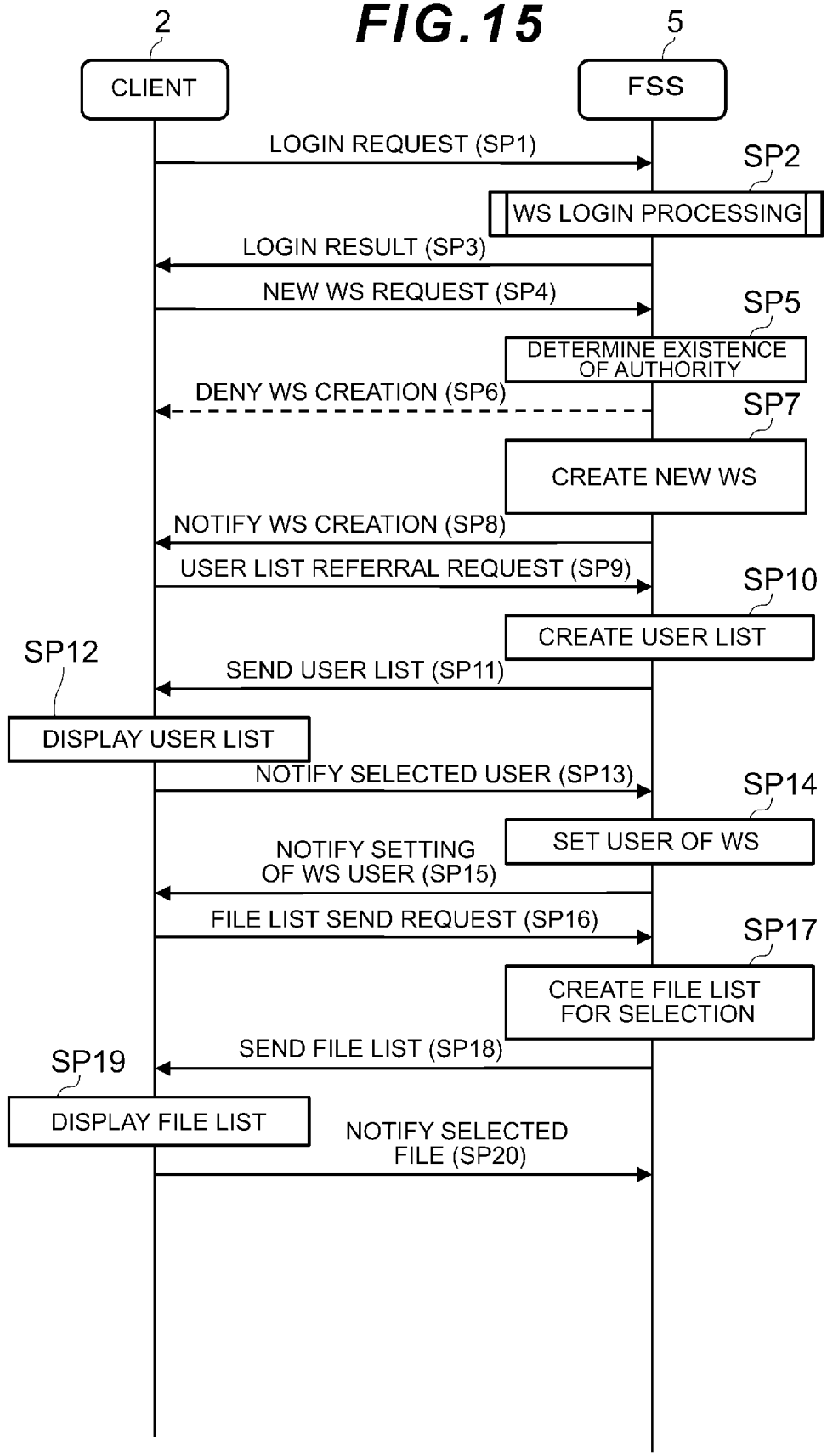
FIG. 15 is a sequence diagram showing the flow of the workspace creation processing.
Figure 16:
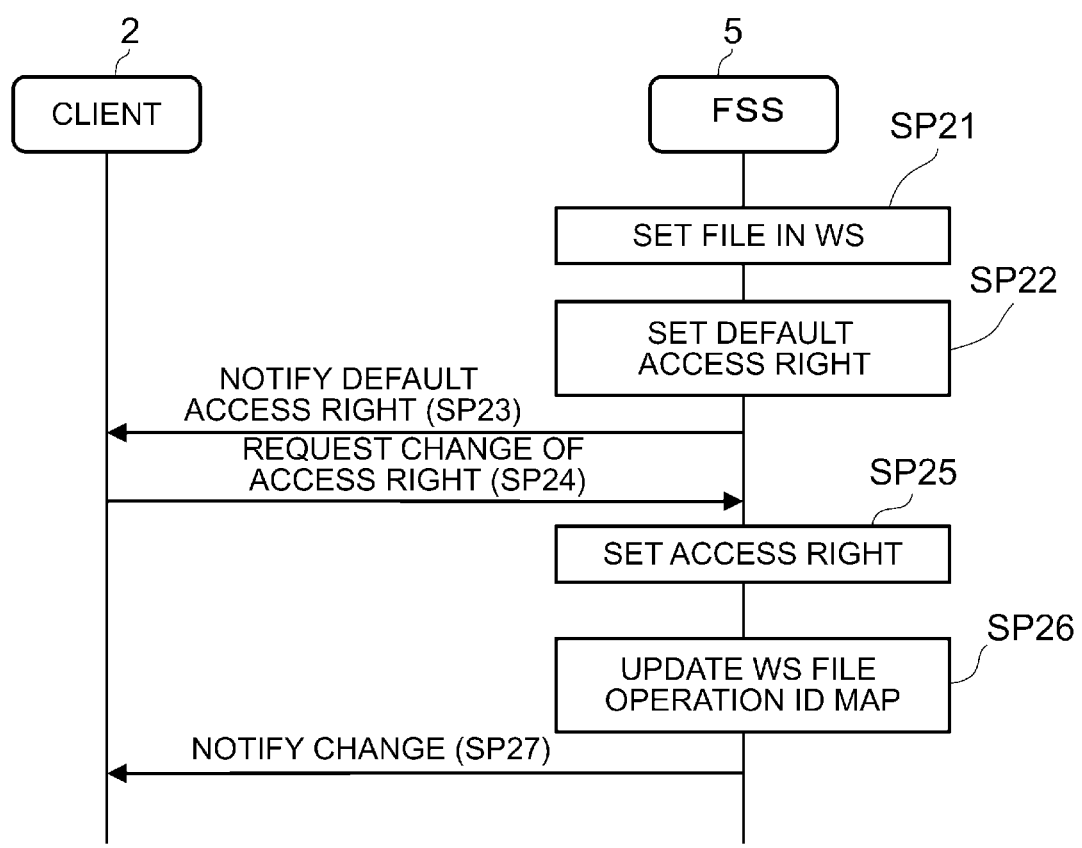
FIG. 16 is a sequence diagram showing the flow of the workspace creation processing.

FIG. 15 and FIG. 16 show the flow of the virtual workspace creation processing that is performed between the client 2 and the file storage system 5 upon the user operating the client 2 and creating a new virtual workspace.

The user foremost operates the client 2 and displays a predetermined login screen, inputs that user's user account and password on that login screen, and commands the client 2 to log into the workspace site. The login request including the foregoing user account and password is thereby sent from the client 2 to the file storage system 5 (SP1).

The workspace-side user account management unit 90 (FIG. 3) of the file storage system 5 that received the foregoing login request executes predetermined login processing (SP2), and returns the processing result of such login processing to the client 2 (SP3).

Meanwhile, if the login is authorized, the user operates the client 2 and displays a predetermined UI screen (User Interface) screen (hereinafter referred to as the "workspace creation screen") for creating a new virtual workspace on the client 2, and commands the creation of a virtual workspace by inputting, on the workspace creation screen, the workspace number of the virtual workspace to be newly created, and the user account and comment of the administrator of that virtual workspace.

A new workspace creation request including information such as the workspace number and the administrator's account and comment input by the user on the workspace creation screen is thereby sent from the client 2 to the file storage system 5 (SP4).

The workspace creation processing unit 91 of the file storage system 5 that received the foregoing new workspace creation request determines whether that user is authorized to create a new virtual workspace (SP5). Specifically, since a list (not shown) of users who are authorized to create a virtual workspace is registered in advance by the administrator of the workspace system, the workspace creation processing unit 91 determines whether that user is authorized to create a virtual workspace based on the foregoing list.

If the workspace creation processing unit 91 obtains a negative result in the foregoing determination, it sends a reply to the effect of denying the request to the client 2 (SP6). A message to the effect that the user is not authorized to create a virtual workspace is thereby displayed on the client 2.

Meanwhile, if the workspace creation processing unit 91 obtains a positive result at step SP5 (that is, if it is determined that the user is authorized to create a virtual workspace), it creates a new virtual workspace according to the foregoing new workspace creation request, and registers the created virtual workspace in the workspace list table 95 (FIG. 8) (SP7).

Specifically, the workspace creation processing unit 91 adds a new entry (row) to the workspace list table 95, and stores the workspace number assigned to the new virtual workspace in the workspace number column 95A of that entry. Moreover, the workspace creation processing unit 91 respectively stores the workspace number and the administrator's account and comment contained in the new workspace creation request in the workspace name column 95B, the administrator column 95D and the comment column 95E of that entry, and additionally stores the date thereof in the creation date column 95C.

The workspace creation processing unit 91 thereafter sends a reply to the client 2 to the effect that a new virtual workspace has been created according to the new workspace creation request (SP8). A message to the effect that the designated virtual workspace has been created is thereby displayed on the client 2.

In order to subsequently select users who are authorized to access the newly created virtual workspace, the user commands the client 2 to display a user list in which users who are authorized to access the file system are registered. Consequently, a user list send request according to the foregoing command is sent from the client 2 to the file storage system 5 (SP9).

The workspace creation processing unit 91 of the file storage system 5 that received the foregoing user list send request creates a user list indicating the user name of all or certain specific users (for example, users of the same affiliated group) who are registered in the user account management table 64 (SP10), and sends the created user list to the client 2 (SP11). The foregoing user list is thereby displayed on the client 2 (SP12).

The user subsequently refers to the user list and selects the users who are authorized to access the created virtual workspace. Consequently, the user name of the respective users who were selected (hereinafter referred to as the "selected users") is notified to the file storage system 5 (SP13).

When the workspace creation processing unit 91 of the file storage system 5 is notified of the user name of the selected users, it sets the selected users as the users of the created virtual workspace (SP14). Specifically, the workspace creation processing unit 91 adds a new entry (column) corresponding to the created virtual workspace in the workspace access management table 96, and sequentially stores, in the accessibility column 96C corresponding to that user, a code of "Allow" if that user is a selected user and "Disallow" if that user is not a selected user for each of the users registered in the workspace access management table 96.

When the workspace creation processing unit 91 completes the foregoing processing regarding all users registered in the workspace access management table 96, it sends a reply to such effect to the client 2 (SP15). A message to the effect that the selected users have been registered as the users of the new virtual workspace is thereby displayed on the client 2.

In order to subsequently select files to be used in the newly created virtual workspace, the user commands the client 2 to display a file list registering the file title of all files or certain specific files (for example, files to which that user is authorized to access) managed by the file system. Consequently, a file list send request is sent from the client 2 to the file storage system 5 according to the foregoing command (SP16).

The workspace creation processing unit 91 of the file storage system 5 that received the user list send request creates a file list registering the file title of all or certain specific files registered in the file basic information index table 73 (FIG. 5) (SP17), and sends the created file list to the client 2 (SP18). The file list is thereby displayed on the client 2 (SP19).

The user subsequently refers to the file list, and selects the files to be used in the created virtual workspace. Consequently, the file title of the respective files that were selected (hereinafter referred to as the "selected files") is notified to the file storage system 5 (SP20).

When the workspace creation processing unit 91 of the file storage system 5 is notified of the file title of the selected files, it selects the selected files as the files to be used in the created virtual workspace (SP21).

Specifically, the workspace creation processing unit 91 adds a new entry (column) corresponding to the created virtual workspace to the workspace file management table 97 (FIG. 10), and stores, in the use/non-use column 97C corresponding to that file, "Use" if that file is a selected file and "Non" if that file is not a selected file for each of the files registered in the workspace file management table 97.

Moreover, the workspace creation processing unit 91 prepares a new workspace file access management table 98 (FIG. 11) corresponding to the created new virtual workspace, respectively registers the selected users and the selected files in the workspace file access management table 98, and sets an access right to the individual selected files for each of the registered selected users (SP22).

Specifically, the workspace creation processing unit 91 refers to the file basic information index table 73 (FIG. 5) and acquires, for each of the selected files, the default access right set in advance to the relevant selected file stored in the access right column 73H of the entry corresponding to that selected file. Subsequently, the workspace creation processing unit 91 respectively stores, in the access right column 98D corresponding to each of the selected users, a code of "non" for the selected users who are not authorized to access that selected file, "R" for the selected users who are authorized only to peruse that selected file, and "R/W" for the selected users who are also authorized to edit that selected file for each of the selected files registered in the workspace file access management table 98 based on the acquired default access right of each of the selected files.

Moreover, in addition to the above, the workspace creation processing unit 91 updates the workspace file operation ID map 100 (FIG. 13) of each of the selected users. Specifically, the workspace creation processing unit 91 adds an entry (column) corresponding to the new virtual workspace to the corresponding workspace file operation ID map 100 for each selected user, stores the workspace file access ID code according to the respective default access rights in each of the workspace file access ID code columns 100C corresponding to each of the selected files in that entry, and stores the workspace file access ID code of "0" in each of the workspace file access ID code columns 100C corresponding to the files other than the selected files in that entry.

The workspace creation processing unit 91 subsequently notifies the client 2 of the default access rights that were respectively set for the individual selected files to each of the selected users as described above (SP23). Consequently, the respective default access rights that were set for each selected file of each selected user are thereby displayed on the client 2.

If the user is to change the access right for each selected file of each selected user displayed on the client 2, the user performs operations for changing the access right of the corresponding selected file of the corresponding selected user to the intended access right on the workspace creation screen, and thereafter commands the client 2 to execute the access right change processing. Consequently, an access right change request is sent from the client 2 to the file storage system 5 according to the foregoing command (SP24).

The workspace creation processing unit 91 of the file storage system 5 that received the foregoing access right change request updates the workspace file access management table 98 according to the foregoing access right change request (SP25). Specifically, the workspace creation processing unit 91 changes the access right of the designated user for accessing the designated selected file in the access right change request to the new access right designated in the access right change request.

Subsequently, the workspace creation processing unit 91 refers to the access right to the respective files in the file system of each user that is being managed separately, and updates the workspace file operation ID map 100 of the respective selected users (SP26).

Specifically, the workspace creation processing unit 91 compares the access right in the file system to that selected file and the access right in the new virtual workspace to that selected file regarding the individual selected files for each selected user.

The workspace creation processing unit 91 changes the workspace file access ID code stored in the corresponding workspace file access ID code column 100C of the workspace file operation ID map 100 to "0" for the selected files in which the access right in the file system and the access right in the new virtual workspace are the same and access to the new virtual workspace is not authorized.

Moreover, the workspace creation processing unit 91 changes the workspace file access ID code stored in the corresponding workspace file access ID code column 100C of the workspace file operation ID map 100 to "1" for the selected files in which the access right in the file system and the access right in the new virtual workspace are different and only referral in the new virtual workspace is authorized.

In addition, the workspace creation processing unit 91 changes the workspace file access ID code stored in the corresponding workspace file access ID code column 100C of the workspace file operation ID map 100 to "2" for the selected files in which the access right in the file system and the access right in the new virtual workspace are different and both referral and editing in the new virtual workspace are authorized.

When the workspace creation processing unit 91 completes the update of the workspace file operation ID map 100 of each of the selected users as described above, it notifies the client 2 to such effect (SP27). The sequential workspace creation processing is thereby ended.

Figure 17:
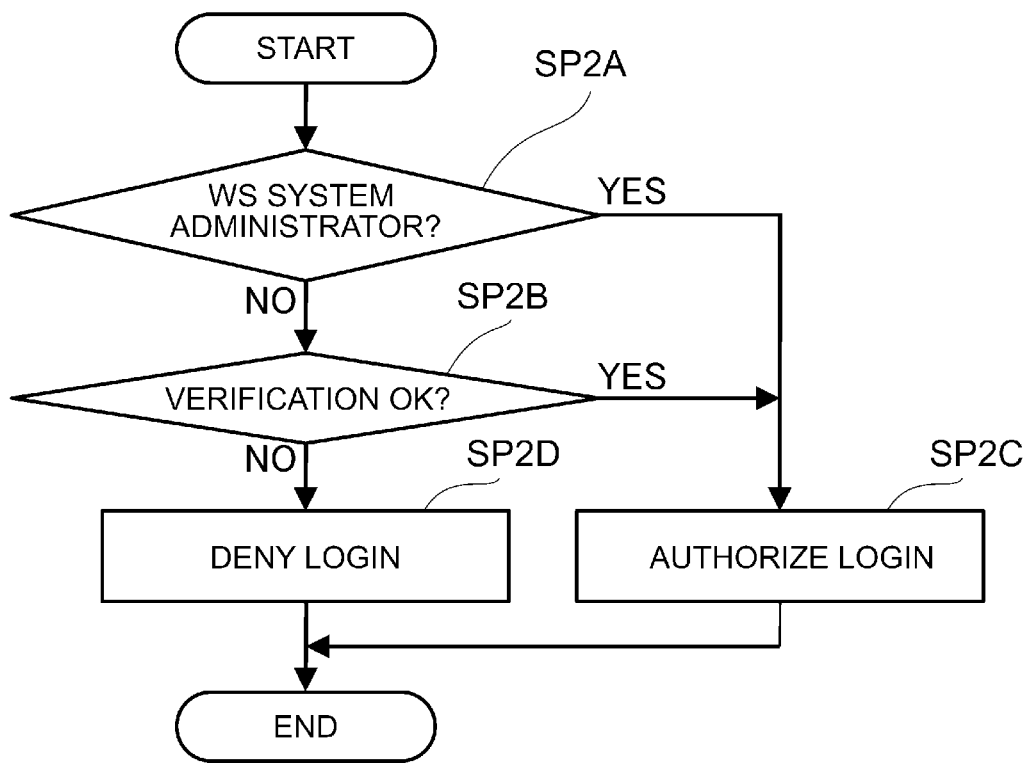
FIG. 17 is a flowchart showing the processing routine of the login processing.

The specific processing contents of the login processing to be executed by the file system-side user account management unit 61 of the file storage system 5 at step SP2 of the workspace creation processing are shown in FIG. 17.

When the file system-side user account management unit 61 receives a login request from the client 2, it starts the login processing shown in FIG. 17, and foremost determines whether that user is the administrator of the overall workspace system providing the virtual workspace service based on the user account included in the login request (SP2A).

If the file system-side user account management unit 61 obtains a positive result in the foregoing determination, it proceeds to step SP2C. Meanwhile, if the file system-side user account management unit 61 obtains a negative result, it refers to the user account management table 64 (FIG. 4) and determines whether that user is a user who is authorized to use the workspace system (SP2B).

If the file system-side user account management unit 61 obtains a positive result in the foregoing determination, it authorizes that user to log in (SP2C), and thereafter ends the login processing. Meanwhile, if the file system-side user account management unit 61 obtains a negative result in the determination at step SP2B, it denies the login of that user (SP2D), and thereafter ends the login processing.

Figure 18:
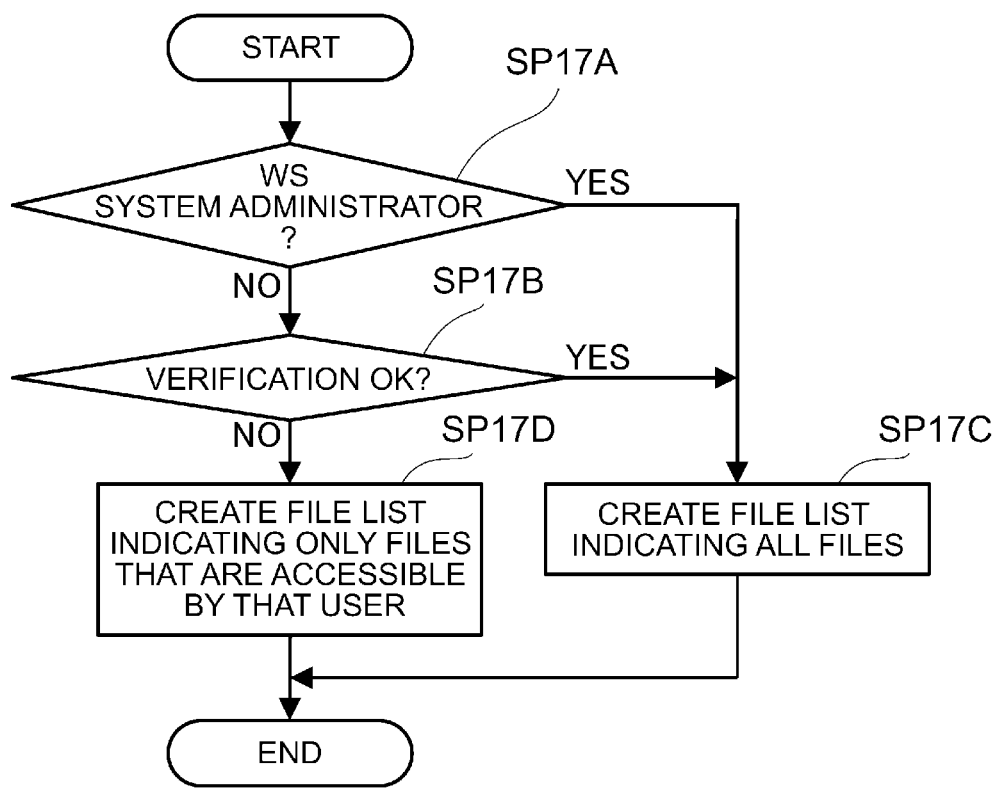
FIG. 18 is a flowchart showing the processing routine of the file list creation processing.

Meanwhile, FIG. 18 shows the specific processing contents of the file list creation processing to be executed by the workspace creation processing unit 91 of the file storage system 5 at step SP17 of the workspace creation processing.

The workspace creation processing unit 91 starts the file list creation processing upon proceeding to step SP17 of the workspace creation processing, and foremost determines whether that user is the administrator of the overall workspace system (SP17A).

If the workspace creation processing unit 91 obtains a positive result in the foregoing determination, it proceeds to step SP17C. Meanwhile, if the workspace creation processing unit 91 obtains a negative result, it refers to the user account management table 64 (FIG. 4) based on the file list send request received at step SP16, and determines whether that user has the access right of all files managed by the file system (SP17B).

If the workspace creation processing unit 91 obtains a positive result in the foregoing determination, it refers to the file basic information index table 73 and creates a file list indicating the file title of all files managed by the file system (SP17C), and thereafter ends the file list creation processing. Meanwhile, if the workspace creation processing unit 91 obtains a negative result in the determination at step SP17B, it creates a file list indicating the file title of only the files for which that user has the access right among the files managed by the file system (SP17D), and thereafter ends the file list creation processing.

(2-2) First File Access Processing

Figure 19:
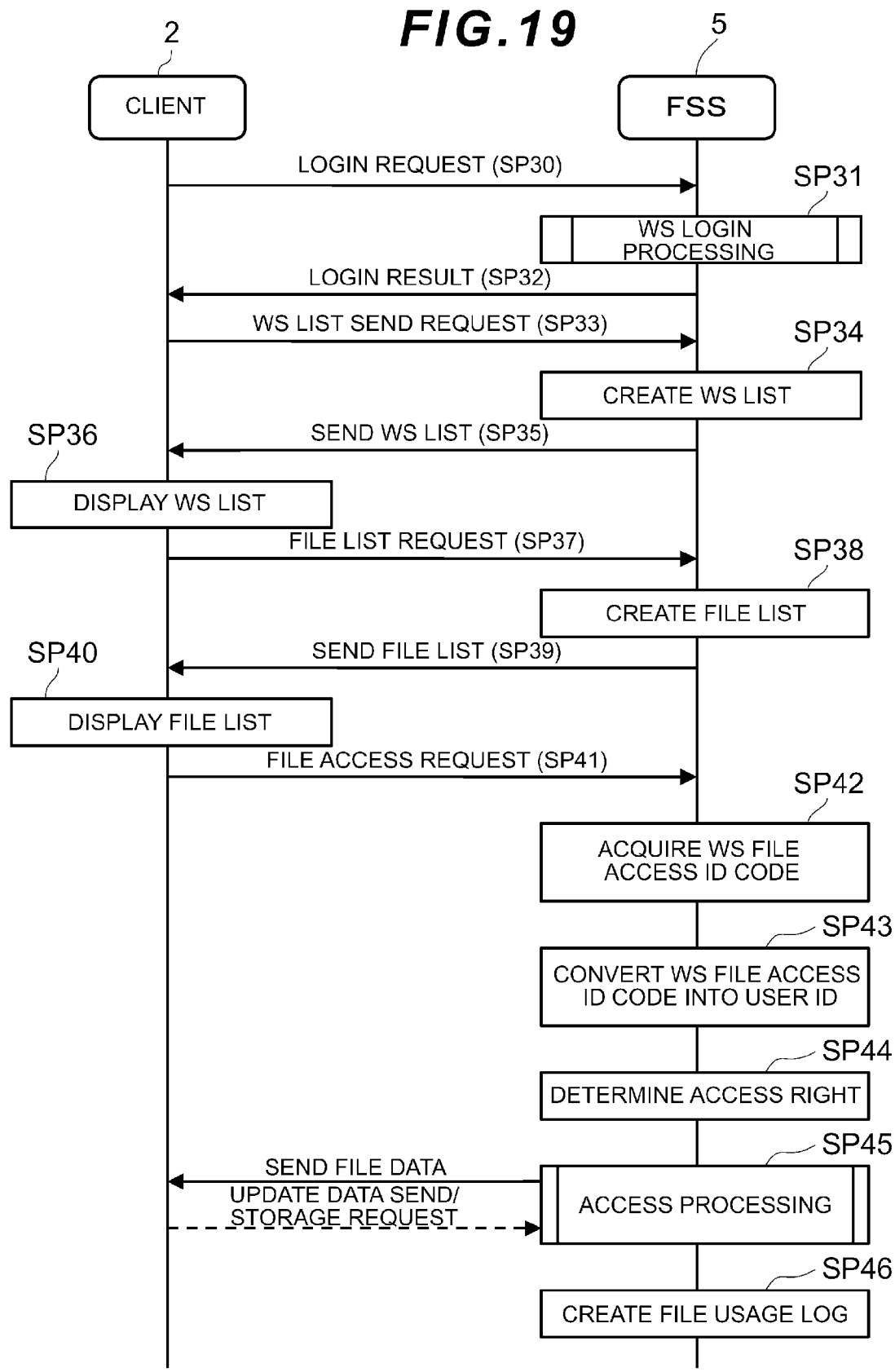
FIG. 19 is a sequence diagram showing the flow of the first file access processing.

FIG. 19 shows the flow of the first file access processing that is performed between the client 2 and the file storage system 5 when the user is to access the files managed by the file system via the virtual workspace.

In the foregoing case, foremost, the user operates the client 2 to display the login screen, enters the user's user account and password on the login screen, and commands the login to the file storage system 5. A login request including the foregoing user account and password is thereby sent from the client 2 to the file storage system 5 (SP30).

The file system-side user account management unit 61 of the file system program 51 of the file storage system 5 that received the foregoing login request executes the login processing that is the same as the login processing described above with reference to FIG. 17 (SP31), and sends the processing result of the login processing to the client 2 (SP32).

Meanwhile, if the login is authorized, the user operates the client 2 and commands the client 2 to display a list (workspace list) of the virtual workspaces that are accessible by that user among the virtual workspaces created in the file storage system 5. Consequently, a first workspace list send request according to the foregoing command is sent from the client 2 to the file storage system 5 (SP33).

The workspace access control unit 92 (FIG. 3) of the file storage system 5 that received the foregoing first workspace list send request searches for the virtual workspaces (virtual workspaces in which "Allow" is registered in the corresponding accessibility column 96C of the workspace access management table 96) that are accessible by that user in the workspace access management table 96 (FIG. 9), and creates a workspace list indicating the workspace number of all virtual workspaces that are accessible by the that user which were detected in the foregoing search (SP34). Moreover, the workspace access control unit 92 sends the created workspace list to the client 2 (SP35). The workspace list is thereby displayed on the client 2 (SP36).

Subsequently, the user operates the client 2 and selects one intended virtual workspace among the virtual workspaces listed on the workspace list, and commands the client 2 to display a list of files (file list) that are being used in the virtual workspace that was selected (selected virtual workspace). Consequently, a file list send request according to the foregoing command is sent from the client 2 to the file storage system 5 (SP37).

The workspace-side file access control unit 93 of the file storage system 5 that received the file list send request refers to the workspace file access management table 98 (FIG. 11) corresponding to the selected virtual workspace, extracts all files for which that user has the access right thereof (files in which a code of "R" or "R/W" is stored in the corresponding access right column 98D in the entry corresponding to that user), and creates a file list indicating the file title of each of the extracted files (SP38). The workspace-side file access control unit 93 sends the created file list to the client 2 (SP39). The file list is thereby displayed on the client 2 (SP40).

Subsequently, the user operates the client 2 and selects the intended access target file from the file list. Consequently, an access request to the selected file is notified from the client 2 to the file storage system 5 (SP41).

The workspace-side file access control unit 93 of the file storage system 5 that received the foregoing access request acquires the workspace file access ID code of that user for accessing that file from the workspace file operation ID map 100 (FIG. 13) corresponding to that user (SP42).

Moreover, the workspace-side file access control unit 93 switches the account of that user, as needed, to the system account according to the access right of that user for accessing that file based on the acquired workspace file access ID code (SP43).

Specifically, if the workspace file access ID code of that user for accessing that file acquired at step SP42 is "1", the workspace-side file access control unit 93 switches the account of that user to a system account of "ws_sys_read" in which only referral is authorized. Moreover, if the foregoing workspace file access ID code is "1", the workspace-side file access control unit 93 switches the account of that user to a system account of "ws_sys_write" in which referral and editing are authorized. Note that the workspace-side file access control unit 93 uses the account of that user as is if the foregoing workspace file access ID code is "0".

The workspace-side file access control unit 93 thereafter requests the file system-side file access control unit 62 to perform the access processing of that user for accessing that file. This is request is made by the workspace-side file access control unit 93 switching the user account of the access request received at step SP41 to "ws_sys_read" or "ws_sys_write" as needed, and thereafter transferring the access request to the file system-side file access control unit 62.

The file system-side file access control unit 62 that received the foregoing access processing request thereby refers to the access right assigned to the respective files based on the account of that user for accessing that file, and determines whether that user has the access right for accessing that file (SP44).

The file system-side file access control unit 62 thereafter executes the access processing based on the foregoing determination result (SP45), and additionally creates a file usage log showing that the file has been provided to that user (SP46). The first file access processing in the file storage system 5 is thereafter ended.

Figure 20:
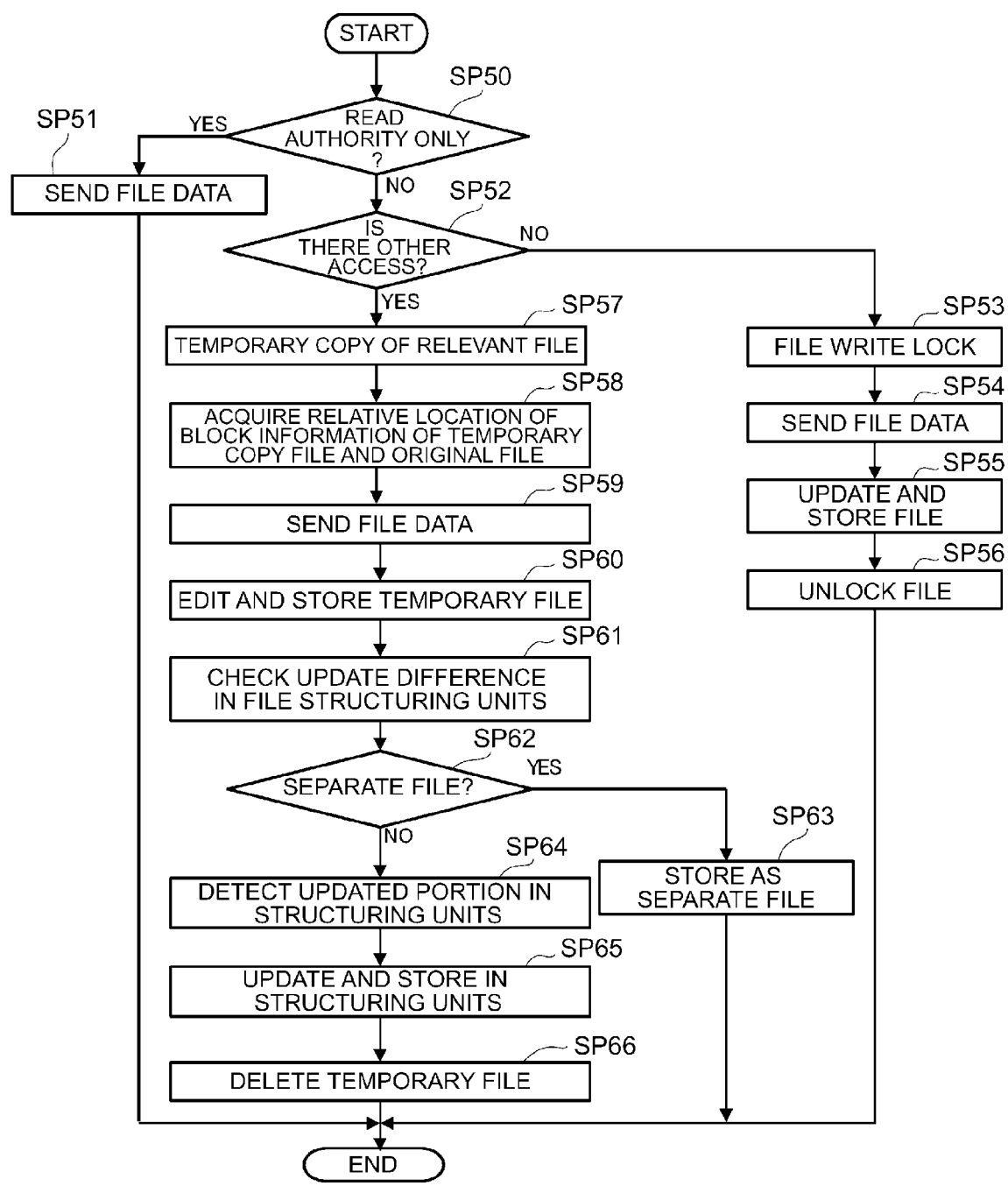
FIG. 20 is a flowchart showing the processing routine of the access processing.

The specific processing contents of the access processing to be executed by the file storage system 5 at step SP45 of the foregoing first file access processing are shown in FIG. 20.

Upon proceeding to step SP45 of the first file access processing, the file system-side file access control unit 62 determines whether the access right of that user for accessing that file is only a referral access right based on the determination result of step SP44 of the first file access processing (SP50).

If the file system-side file access control unit 62 obtains a positive result in the foregoing determination, if reads the file data of the corresponding file from the storage unit 6 (FIG. 1), and sends the read file data to the corresponding client 2 (SP51), and thereafter ends the processing of step SP45 of the first file access processing.

Meanwhile, if the file system-side file access control unit 62 obtains a negative result in the determination at step SP50, it notifies the workspace-side file access control unit 93 of the virtual workspace program 54 to such effect. Consequently, the workspace-side file access control unit 93 and the file system-side file access control unit 62 thereafter determine whether another user is updating the access target file (SP52).

To obtain a negative result in the foregoing determination means that none of the users are accessing that file or that a certain user is accessing that file but only by way of referral. Consequently, the file system-side file access control unit 62 locks that file so that it will not be accessed by another user for editing (hereinafter referred to as the "file write lock") (SP53).

Moreover, the file system-side file access control unit 62 thereafter reads the file data of that file from the storage unit 6 (FIG. 1), and sends the read file data to the corresponding client 2 (SP54). In addition, when the update request or storage request of that file is issued from the client 2, the update or storage of that file is commanded to the file storage management unit 63 (FIG. 3). Consequently, under the control of the file storage management unit 63, the file data of that file stored in the storage unit 6 is updated, or the file data of that file is stored in the storage unit 6 (SP55).

The file system-side file access control unit 62 thereafter unlocks the file write lock set to that file at step SP53 when the access to that file from the foregoing user is ended (SP56), and subsequently ends the file update/storage processing.

Meanwhile, to obtain a positive result in the determination at step SP52 means that one of the users is updating that file, and that a file write lock is set to that file. Consequently, the workspace-side file access control unit 93 issues a command to the file update control unit 94 (FIG. 3) for creating a temporary copy of that file (hereinafter referred to as the "temporary copy"). Consequently, the file update control unit 94 creates the temporary copy of that file, and this is stored in a predetermined area (for example, the "WS temporary area" of FIG. 1) provided to the logical volume VOL in the storage unit 6 (FIG. 1) (SP57).

Subsequently, the file update control unit 94 acquires, for example, from the file storage management table 65 (FIG. 3), information concerning the relative location regarding to which logical blocks of the respective original files the respective blocks of the temporary copy of that file are associated (SP58).

The workspace-side file access control unit 93 thereafter reads the file data of that file from the storage unit 6 (FIG. 1), and sends the read file data for editing to the corresponding client 2 (SP59). In addition, when the update request or storage request of that file is issued from the client 2, the update or storage of that file is commanded to the file storage management unit 63 (FIG. 3). Consequently, under the control of the file storage management unit 63, the file data of that file stored in the storage unit 6 is updated, or the file data of that file is stored in the storage unit 6 (SP60).

If the update of storage of the access target file is performed as described above, the workspace-side file access control unit 93 notifies the structured file/block management program 53 to such effect. When the file structuring unit update unit 80 of the structured file/block management program 53 receives the foregoing notice, it compares the temporary copy of that file stored in the file storage control memory 32 and the original file, and detects the updated portion in that file using the file structuring unit (SP61). Subsequently, the file structuring unit update unit 80 notifies the detection result to the file update control unit 94 (FIG. 3) of the virtual workspace program 54.

The file update control unit 94 thereafter determines whether the storage method designated in the storage request is the first storage method of storing the file in structuring units (SP62).

Specifically, if the user operates the client 2 and inputs the file storage command displayed on the client 2, the client 2 displays a storage method selection screen for causing the user to select, as the storage method, a first storage method of storing that file in structuring units, or a second storage method of storing that file as a separate file. The code (hereinafter referred to as the "storage method code") representing the storage method selected by the user on the storage method selection screen is stored in the foregoing storage request and sent from the client 2 to the file storage system 5.

The file update control unit 94 of the file storage system 5 that received the storage request refers to the foregoing storage method code stored in the storage request and determines whether the file storage method designated by the user is the first storage method.

If the file update control unit 94 obtains a negative result in the foregoing determination, it commands the file storage management unit 63 of the file system program 61 to store that file. When the file storage management unit 63 receives the foregoing command, it stores that file as a file (new file) that is separate from the original file in the corresponding storage area of the storage unit 6.

Meanwhile, if the file update control unit 94 obtains a negative result in the determination at step SP62, it notifies the file structuring unit update unit 80 (FIG. 3) of the structured file/block management program 53 to such effect. The file structuring unit update unit 80 thereby detects each of the updated structuring units in the access target file according to the foregoing notice (SP64), and controls the storage unit 6 to update the detected structuring units (SP65).

Moreover, the file update control unit 94 deletes the temporary copy of the access target stored in the file storage control memory 32 (FIG. 1) of the file storage control unit 7 (FIG. 1) at step SP57 (SP66). The file update/storage processing in the file storage system 5 is thereby ended.

(2-3) Second File Access Processing

Figure 21:
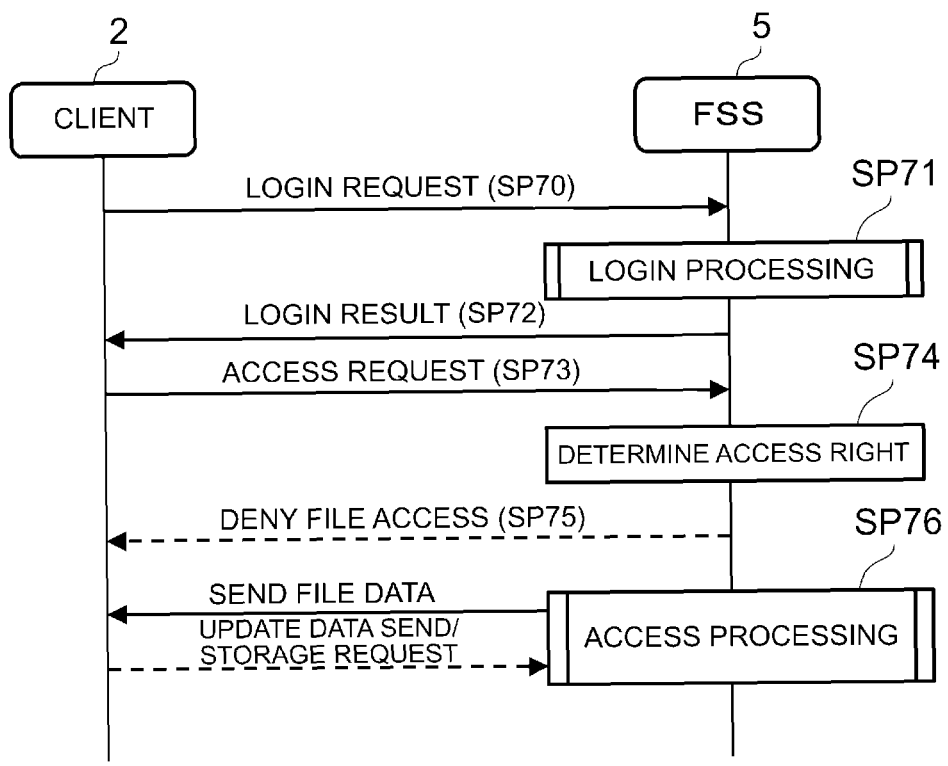
FIG. 21 is a sequence diagram showing the flow of the second file access processing.

Meanwhile, FIG. 21 shows the flow of the second file access processing that is performed between the client 2 and the file storage system 5 when the user accesses the files managed with the file system directly from the file system.

In the foregoing case, foremost, the user operates the client 2 to display the login screen, enters the user's user account and password on the login screen, and commands the login to the file storage system 5. A login request including the foregoing user account and password is thereby sent from the client 2 to the file storage system 5 (SP70).

The file system-side user account management unit 61 of the file system program 51 of the file storage system 5 that received the foregoing login request executes the login processing that is the same as the login processing described above with reference to FIG. 17 (SP71), and sends the processing result of the login processing to the client 2 (SP72).

Meanwhile, if the login is authorized, the user operates the client 2 and selects the intended file among the files managed by the file system. Consequently, an access request to that file is sent from the client 2 to the file storage system 5 (SP73).

The file system-side file access control unit 62 of the file storage system 5 that received the foregoing access request determines the access right of that user for accessing that file (SP74), and denies the access request for accessing that file if the user does not have the access right for accessing that file (SP75).

Meanwhile, the file system-side file access control unit 62 executes the access processing to that file if the user has the access authority for accessing that file (SP76).

Specifically, if that user only has a referral access right as the access right for accessing that file in the file system, the file system-side file access control unit 62 reads the file data of that file from the storage unit 6, and sends the read file data to the client 2. The contents of that file are thereby displayed on the client 2 based on the foregoing file data. When the user thereafter finishes referring to that file, the file storage system 5 ends the second file access processing.

Meanwhile, if that user has the access right for referral and editing as the access right for accessing that file in the file system, the file system-side file access control unit 62 executes the same processing as step SP53 to step SP56 of the first file access processing described above with reference to FIG. 20. When the user thereafter finishes editing that file, the file storage system 5 ends the second file access processing.

(2-4) Processing Upon Change of File Configuration/File Access Right

Figure 22:
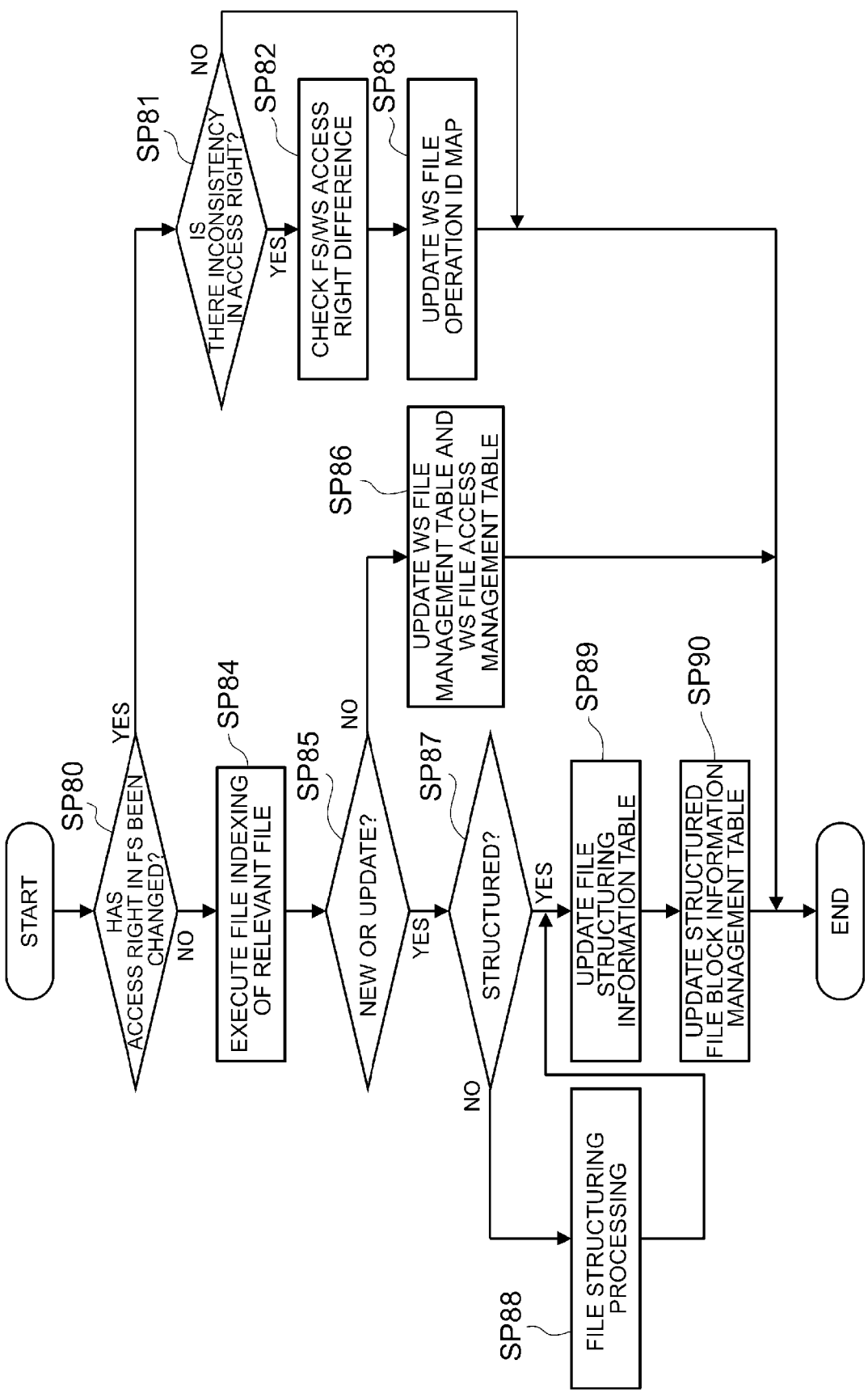
FIG. 22 is a flowchart showing the processing routine of the processing upon change of file configuration/file access right.

Meanwhile, FIG. 22 shows the processing contents of the processing upon change of file configuration/file access right that is executed in the file storage system when the file configuration in the file system is changed or the access right of one of the users for accessing one of the files is changed.

The processing upon change of file configuration/file access right is started when the file storage management unit 63 (FIG. 3) of the file system program 51 (FIG. 3) detects the creation, update or deletion of a file or the change in the access right of a file, or when the file update control unit 94 (FIG. 3) of the virtual workspace program 54 (FIG. 3) detects the creation, update or deletion of a file or the change in the access right of a file and notifies the file storage management unit 63 to such effect.

The file storage management unit 63 foremost determines whether the reason for starting the processing upon change of file configuration/file access right is the change in the access right of one of the users for accessing one of the files (SP80). If the file storage management unit 63 obtains a positive result in the foregoing determination, it commands the workspace creation processing unit 91 (FIG. 3) of the virtual workspace program 54 (FIG. 3) to execute the access right inconsistency determination processing.

The workspace creation processing unit 91 that received the foregoing command compares the access right stored in the access right column 73H of the entry corresponding to that file in the file basic information index table 73 (FIG. 5), and the access right of the respective users for accessing that file which was set in the workspace file access management table 98 (FIG. 11) provided in correspondence with each of the virtual workspaces, and determines whether there is any inconsistency between the access right in the file system of the respective users for accessing that file and the access right in the virtual workspace of the respective users for accessing that file (SP81).

If a positive result is obtained in the foregoing determination, the processing upon change of file configuration/file access right in the file storage system 5 is ended.

Meanwhile, if a negative result is obtained in the determination at step SP81, the workspace creation processing unit 91 checks the difference between the access right in the file system of the individual users for accessing that file and the access right in the workspace (SP82).

The workspace creation processing unit 91 updates the workspace file operation ID map 100 as needed based on the check result of step SP82 (SP83).

Specifically, if the access right in the file system of the individual users for accessing that file and the access right in the virtual workspace are the same, the workspace creation processing unit 91 updates the workspace file access ID code stored in the workspace file access ID code column 100C corresponding to that file in the workspace file operation ID map 100 corresponding to that user to "0".

Moreover, if the access right in the file system for accessing that file and the access right in the virtual workspace are difference and the access right in the virtual workspace is only for referral, the workspace creation processing unit 91 updates the workspace file access ID code stored in the workspace file access ID code column 100C corresponding to that file in the workspace file operation ID map 100 corresponding to that user to "1".

In addition, if the access right in the file system for accessing that file and the access right in the virtual workspace are difference and the access right in the virtual workspace is an access right that also authorizes editing, the workspace creation processing unit 91 updates the workspace file access ID code stored in the workspace file access ID code column 100C corresponding to that file in the workspace file operation ID map 100 corresponding to that user to "2".

When the update of the workspace file operation ID map 100 by the workspace creation processing unit 91 is complete, the processing upon change of file configuration/file access right in the file storage system 5 is ended.

Meanwhile, to obtain a negative result in the determination at step SP80 means that the reason for starting the processing upon change of file configuration/file access right is the creation, update or deletion of one of the files. Consequently, the file storage management unit 63 issues a file index creation command of that file to the file index creation unit 70 (FIG. 3) of the search engine program 52 (FIG. 3).

When the file index creation unit 70 receives the foregoing file index creation command, it creates an index regarding that file including that file's file title, file ID, file size, file type, application type, file structuring type, access right, creation date and time, update date and time, access date and time, creator, owner and updater, and the access path to that file, and registers the index in the file basic information index table 73 (FIG. 5) (SP84).

Subsequently, the file index creation unit 70 determines whether the reason for starting the processing upon change of file configuration/file access right is the creation or update of one of the files (SP85).

If the file index creation unit 70 obtains a negative result in the foregoing determination, it issues a command to the workspace creation processing unit 91 of the virtual workspace program 54 for updating the workspace file management table 97 (FIG. 10) and the corresponding workspace file access management table. Consequently, the workspace creation processing unit 91 updates the workspace file management table 97 and the corresponding workspace file access management table 98 (FIG. 11) so as to delete the entries concerning the deleted files according to the foregoing command (SP86).

Meanwhile, if the file index creation unit 70 obtains a positive result in the determination at step SP85, it refers to the file basic information index table 73 (FIG. 5) and determines whether that file has been previously segmentalized into a plurality of structuring units (SP87).

To obtain a negative result in the foregoing determination means that the corresponding file is a newly created file. Consequently, the file index creation unit 70 commands the file structuring conversion unit 72 to execute the structuring processing to that file.

Consequently, the file structuring conversion unit 72 segmentalizes that file into a plurality of structuring units, creates the file structuring information table 74 (FIG. 6) and the structured file block information management table 82 (FIG. 7) corresponding to that file based on the foregoing result, and stores the file structuring type of that file obtained based on the structuring processing in the file structuring type column 73G of the entry corresponding to that file in the file basic information index table 73 (SP88).

When the creation of the file structuring information table 74 and the structured file block information management table 82 by the file structuring conversion unit 72 is complete, the routine proceeds to step SP89.

Meanwhile, to obtain a negative result in the determination at step SP87 means that the corresponding file was updated. Consequently, the file index creation unit 70 issues a command for updating the file structuring information table 74 and the structured file block information management table 82 corresponding to that file.

Consequently, the file structuring conversion unit 72 respectively updates the file structuring information table 74 and the structured file block information management table 82 corresponding to that file according to the update contents of that file (SP89, SP90).

When the update of the file structuring information table 74 and the structured file block information management table 82 by the file structuring conversion unit 72 is complete, the processing upon change of file configuration/file access right in the file storage system 5 is ended.

(2-5) Access Right Change Processing

Figure 23:
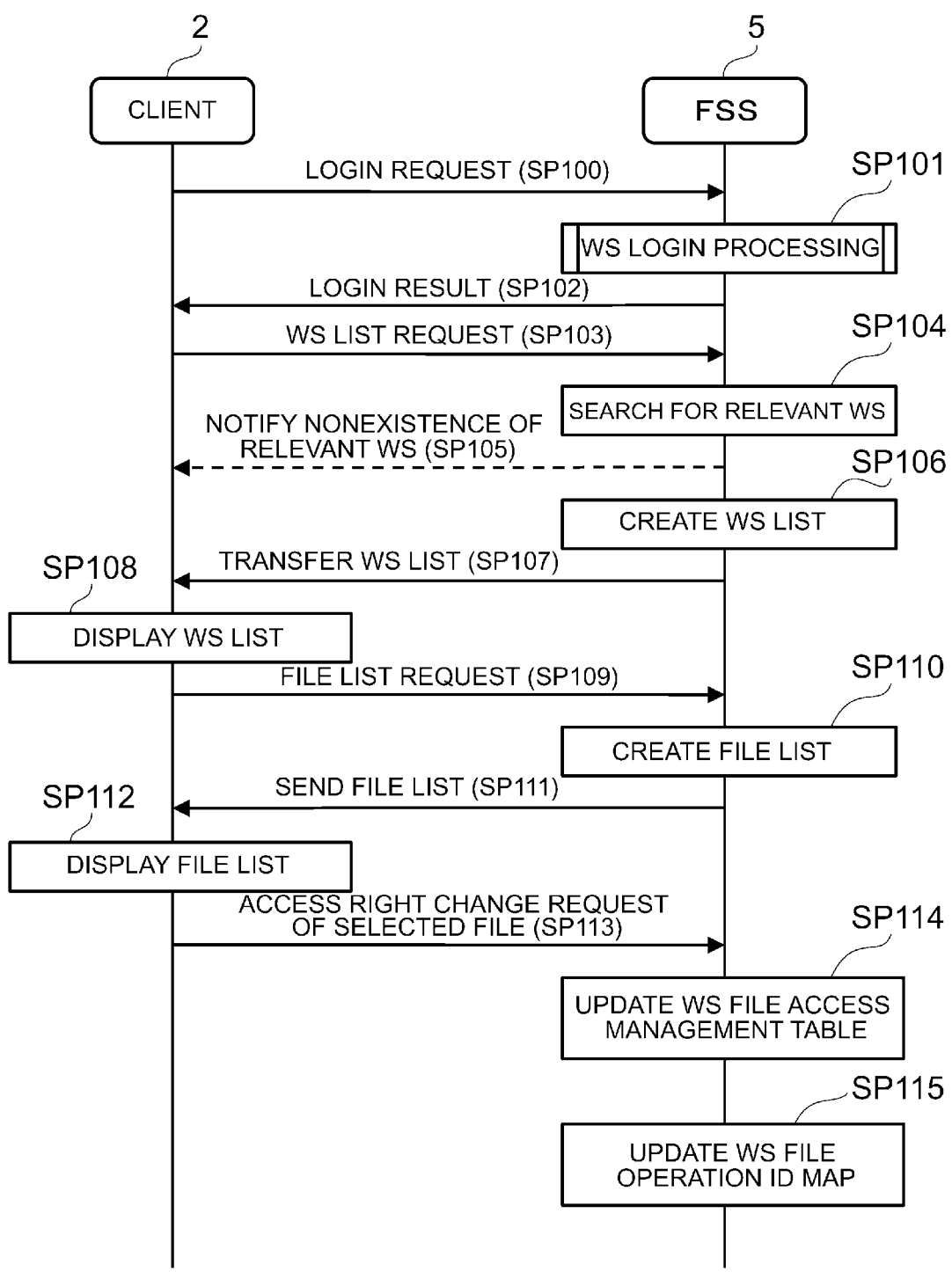
FIG. 23 is a sequence diagram showing the flow of the access right change processing.

Meanwhile, FIG. 23 shows the flow of the access right change processing that is executed in the file storage system 5 upon changing, in the virtual workspace, the access right of one of the users for accessing one of the files that are being used in the virtual workspace.

Foremost, the user operates the client 2 to display the login screen, enters the user's user account and password on the login screen, and commands the login to the workspace site. A login request including the foregoing user account and password is thereby sent from the client 2 to the file storage system 5 (SP100).

The workspace-side user account management unit 90 (FIG. 3) of the file storage system 5 that received the foregoing login request executes the login processing that is the same as the login processing described above with reference to FIG. 17 (SP101), and sends the processing result of the login processing to the client 2 (SP102).

Meanwhile, if the login is authorized, the user operates the client 2 and commands the client 2 to display a list (workspace list) of the virtual workspaces in which the setting of the access right of the files being used by that user in that virtual workspace can be changed among the virtual workspaces created in the file storage system 5. Consequently, a second workspace list send request according to the foregoing command is sent from the client 2 to the file storage system 5 (SP103).

The workspace creation processing unit 91 (FIG. 3) of the file storage system 5 that received the foregoing second workspace list send request searches for the virtual workspaces in which that user is registered as the administrator in the workspace list table 95 (FIG. 8) (virtual workspaces corresponding to the entry in which the user name of that user is stored in the administrator column 95D) (SP104).

If the workspace creation processing unit 91 determines that, based on the foregoing search, there are no virtual workspaces in which the setting of the access right of the files being used by that user in that virtual workspace can be changed, it notifies the client 2 to such effect (SP105). A message to such effect is thereby displayed on the client 2.

Meanwhile, if there is a virtual workspace in which the setting of the access right of the files being used by that user in that virtual workspace can be changed, the workspace creation processing unit 91 creates a workspace list indicating the workspace number of all such virtual workspaces (SP106), and sends the created workspace list to the client 2 (SP107). The workspace list is thereby displayed on the client 2 (SP108).

Subsequently, the user operates the client 2 and selects one intended virtual workspace among the virtual workspaces listed on the workspace list, and commands the client 2 to display a list of files (file list) that are being used in the virtual workspace that was selected (selected virtual workspace). Consequently, a file list send request according to the foregoing command is sent from the client 2 to the file storage system 5 (SP109).

The workspace-side file access control unit 93 (FIG. 3) of the file storage system 5 that received the file list send request refers to the workspace file access management table 98 corresponding to the selected virtual workspace, and creates a file list indicating the file title of all files that are being used in that virtual workspace (SP110). Subsequently, the workspace-side file access control unit 93 sends the created file list to the client 2 (SP111). The file list is thereby displayed on the client 2 (SP112).

Consequently, the user refers to the file list and operates the client 2 so as to change the access right of the intended user for accessing the intended file to the intended access right. An access right change request according to the user's foregoing operation is thereby sent from the client 2 to the file storage system 5 (SP113).

The workspace creation processing unit 91 of the file storage system 5 that received the foregoing access right change request updates the workspace file access management table 98 of the designated user (SP114).

Moreover, the workspace creation processing unit 91 updates the workspace file operation ID map 100 as needed pursuant to the change of the foregoing access right (SP115).

Specifically, if the access right in the file system of the individual users for accessing that file and the access right in the virtual workspace are the same, the workspace creation processing unit 91 updates the workspace file access ID code stored in the workspace file access ID code column 100C corresponding to that file in the workspace file operation ID map 100 corresponding to that user to "0".

Moreover, if the access right in the file system for accessing that file and the access right in the virtual workspace are difference and the access right in the virtual workspace is only for referral, the workspace creation processing unit 91 updates the workspace file access ID code stored in the workspace file access ID code column 100C corresponding to that file in the workspace file operation ID map 100 corresponding to that user to "1".

In addition, if the access right in the file system for accessing that file and the access right in the virtual workspace are difference and the access right in the virtual workspace is an access right that also authorizes editing, the workspace creation processing unit 91 updates the workspace file access ID code stored in the workspace file access ID code column 100C corresponding to that file in the workspace file operation ID map 100 corresponding to that user to "2".

When the update of the workspace file operation ID map 100 by the workspace creation processing unit 91 is complete, the access right change processing in the file storage system 5 is ended.

(2-6) User Change Processing

Figure 24:
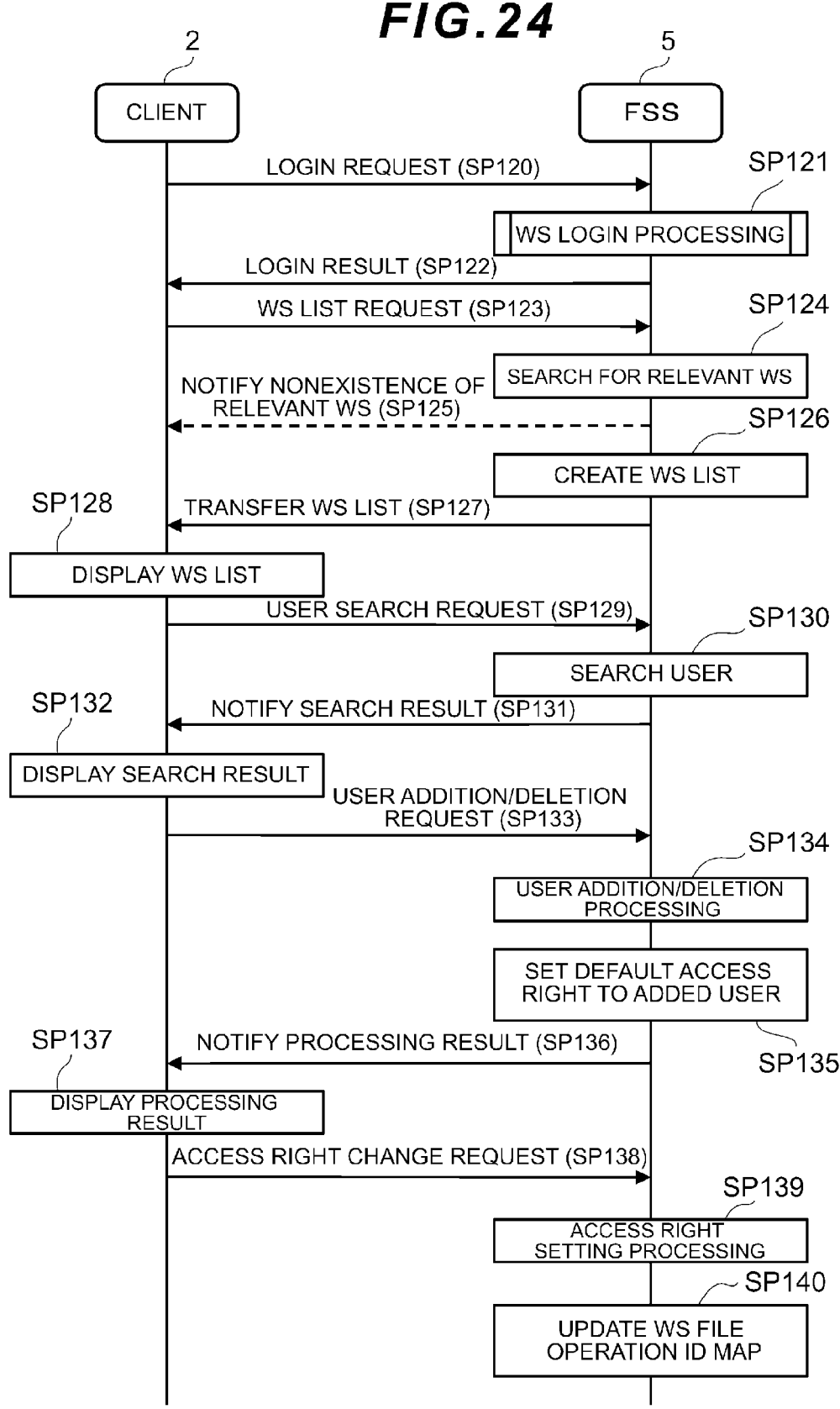
FIG. 24 is a sequence diagram showing the flow of the user change processing.

FIG. 24 shows the flow of the user change processing that is performed between the client and the file storage system upon adding or deleting a user of the virtual workspace.

Foremost, the user operates the client 2 to display the login screen, enters the user's user account and password on the login screen, and commands the login to the file storage system 5. A login request including the foregoing user account and password is thereby sent from the client 2 to the file storage system 5 (SP120).

The file system-side user account management unit 61 of the file storage system 5 that received the foregoing login request executes the login processing that is the same as the login processing described above with reference to FIG. 17 (SP121), and sends the processing result of the login processing to the client 2 (SP122).

Meanwhile, if the login is authorized, the user operates the client 2 and commands the client 2 to display a list (workspace list) of the virtual workspaces in which that user is able to add or delete users among the virtual workspaces created in the file storage system 5. Consequently, a third workspace list send request according to the foregoing command is sent from the client 2 to the file storage system 5 (SP123).

The workspace creation processing unit 91 (FIG. 3) of the file storage system 5 that received the foregoing third workspace list send request searches for the virtual workspaces in which that user is registered as the administrator in the workspace list table 95 (FIG. 8) (SP124).

If the workspace creation processing unit 91 determines that, based on the foregoing search, there are no virtual workspaces in which that user is able to add or delete users among the virtual workspaces, it notifies the client 2 to such effect (SP135). A message to such effect is thereby displayed on the client 2.

Meanwhile, if there is a virtual workspace in which that user is able to add or delete users among the virtual workspaces, the workspace creation processing unit 91 creates a workspace list indicating the workspace number of all such virtual workspaces (SP126), and sends the created workspace list to the client 2 (SP127). The workspace list is thereby displayed on the client 2 (SP128).

Subsequently, the user operates the client 2 and selects one intended virtual workspace among the virtual workspaces listed on the workspace list, and designates the search conditions such as the user name and/or the affiliated group of the user to be added to the virtual workspace that was selected (selected virtual workspace). Consequently, a user search request according to the foregoing command is sent from the client 2 to the file storage system 5 (SP129).

The index search unit 71 of the file storage system 5 that received the foregoing user search request searches for users who satisfy the search conditions included in the user search request from the user account management table 64 (FIG. 3) (SP131), and notifies the search result to the client 2 (SP131). The search result is thereby displayed on the client 2 (SP132).

Consequently, the user refers to the foregoing search result displayed on the client 2 and commands the client 2 to add the intended user as a user of that virtual workspace or delete the intended user as a user from that virtual workspace. A user addition/deletion request according to the user's foregoing operation is thereby sent from the client 2 to the file storage system 5 (SP133).

The workspace creation processing unit 91 of the file storage system 5 that received the foregoing user addition/deletion request updates the workspace access management table 96 (FIG. 9) so as to add the designated user to the designated virtual workspace or delete that user from that virtual workspace (SP134). If a user is deleted from the virtual workspace, the user change processing is ended after step SP134.

Meanwhile, if a user is added to the virtual workspace, the workspace creation processing unit 91 thereafter refers to the file basic information index table 73 (FIG. 5), and sets the default access right of the user who was added (hereinafter referred to as the "added user") for accessing the respective files that are being used in that virtual workspace (SP135). The workspace creation processing unit 91 thereafter notifies the processing result of the foregoing processing to the client 2 (SP136). The processing result is thereby displayed on the client 2 (SP137).

Consequently, the user refers to the processing result displayed on the client 2, and, if needed, operates the client 2 so as to change the access right of that user for accessing the respective files that are being used in that virtual workspace to the intended access right. An access right change request according to the user's foregoing operation is thereby sent from the client 2 to the file storage system 5 (SP138).

The workspace creation processing unit 91 (FIG. 3) of the file storage system 5 that received the foregoing access right change request updates the access right of that added user for accessing the designated files in the workspace file access management table 98 to the designated access right (SP139).

Moreover, pursuant to the change of the foregoing access right, the workspace creation processing unit 91 updates the workspace file operation ID map 100 as needed as with step SP115 of the access right change processing described above with reference to FIG. 23 (SP140).

When the update of the workspace file operation ID map 100 by the workspace-side file access control unit 93 is complete, the user change processing in the file storage system 5 is ended.

(3) Effect of Present Embodiment

As described above, with the computer system 1, it is possible to set an access right in a virtual workspace that is separate from an access right in the file system, and a user is able to access files within the range of one's access right in that virtual workspace. Accordingly, merely by setting an access right in that workspace, an access right to a file used in the workspace of a user using such workspace can be easily set, and, consequently, it is possible to facilitate the setting and change of an access right of the user for accessing the files.

(4) Other Embodiments

Although the foregoing embodiment explained a case of storing the temporary copy of the update target file in the logical volume VOL of the storage unit 6 (FIG. 1) at step SP57 of the access processing explained above with reference to the drawings, the present invention is not limited thereto, and, for example, the temporary copy of the update target file may also be stored in the file storage control memory 32 of the file storage control unit 7 (FIG. 1).

Moreover, although the foregoing embodiment explained a case of applying the present invention to the file storage system 5 configured as shown in FIG. 1, the present invention is not limited thereto, and may be also broadly applied to file storage apparatuses of various configurations.

INDUSTRIAL APPLICABILITY

The present invention can be broadly applied to various types of file storage apparatuses.

REFERENCE SIGNS LIST

1 . . . computer system, 2 . . . client, 5 . . . file storage system, 6 . . . storage unit, 7 . . . file storage control unit, 31 . . . file storage control CPU, 32 . . . file storage control memory, 51 . . . file system program, 52 . . . search engine program, 53 . . . structured file/block management program, 54 . . . virtual workspace program, 60 . . . file sharing service unit, 61 . . . file system-side user account management unit, 62 . . . file system-side file access control unit, 63 . . . file storage management unit, 64 . . . user account management table, 65 . . . file storage management table, 70 . . . file index creation unit, 71 . . . index search unit, 72 . . . file structuring conversion unit, 80 . . . file structuring unit update unit, 82 . . . structured file block information management table, 90 . . . workspace-side user account management unit, 91 . . . workspace creation processing unit, 92 . . . workspace access control unit, 93 . . . workspace-side file access control unit, 94 . . . file update control unit, 95 . . . workspace list table, 96 . . . workspace access management table, 97 . . . workspace file management table, 98 . . . workspace file access management table, 99 . . . workspace system account map, 100 . . . workspace file operation ID map.

The invention claimed is:

1. A file storage apparatus, which provides a file system to a client and provides a workspace to a user and comprises at least one computer:
   a storage medium configured to store a file;
   a memory configured to store:
      file management information, which includes a first access right of the user to the file on the file system;
      workspace access right information, which includes a second access right of the user to the workspace;
      workspace file utilization information, which includes a utilization condition of the file on the workspace;
      account management information, which includes a first account authorized to read the file and a second account authorized to read and edit the file; and
      workspace file management information, which includes a third access right of the user to the file on the workspace; and
   a controller, which is configured to:
      manage, using the at least one computer, the first access right of the user to the file on the file system;
      process, using the at least one computer, a first access to the file on the file system based on the first access right of the user by referring to the file management information;
      create, using the at least one computer, the third access right of the workspace file management information based on the first access right of the file management information, the second access right of the workspace access right information and the utilization condition of the file on the workspace file utilization information;
      when the user accesses the file via the workspace,
         process, using the at least one computer, a second access to the workspace based on the second access right of the workspace access right information;
         identify, using the at least one computer, the third access right of the user to the file on the workspace based on the workspace file management information;
         switch, using the at least one computer, the second access right of the user to the identified third access right; and
         process, using the at least one computer, an access to the file on the workspace by the identified third access right.

2. The file storage apparatus according to claim 1, wherein the controller is further configured to:
   segmentalize, using the at least one computer, the file into a plurality of structuring units;
   update, using the at least one computer, the file for each of the structuring units,
   form, using the at least one computer, a temporary copy of the file that is a target of an update request if another user is updating the file,
   update, using the at least one computer, the temporary copy according to the update request, detect the structuring unit that was updated after the update of the temporary copy is completed, and
   update, using the at least one computer, the structuring units of the file that were updated for each of the structuring units.

3. The file storage apparatus according to claim 1, wherein the controller is further configured to:
   segmentalize, using the at least one computer, a file into a plurality of structuring units;
   update, using the at least one computer, the file for each of the structuring units; and
   update, using the at least one computer, only the structuring units of the file that were updated according to an update request of the file if another user is updating the file.

4. The file storage apparatus according to claim 3, wherein the controller is further configured to:
   form, using the at least one computer, a temporary copy of the file that is a target of an update request if another user is updating the file,
   update, using the at least one computer, the temporary copy according to the update request,
   detect, using the at least one computer, the structuring unit that was updated after the update of the temporary copy is completed, and
   update, using the at least one computer, each of the structuring units that were updated.

5. An access control method in a file storage apparatus, which provides a file system to a client and provides a workspace to a user, wherein the file storage apparatus comprises at least one computer comprising:
   a storage medium configured to store a file;
   a memory configured to store:
      file management information, which includes a first access right of the user to the file on the file system;
      workspace access right information, which includes a second access right of the user to the workspace;

workspace file utilization information, which includes a utilization condition of the file on the workspace;

account management information, which includes a first account authorized to read the file and a second account authorized to read and edit the file; and workspace file management information, which includes a a third access right to the file on the workspace to the user; and a controller;

wherein the access control method comprises steps of:

managing, using the at least one computer, the first access right of the user to the file on the file system;

processing, using the at least one computer, a first access to the file on the file system based on the first access right of the user by referring to the file management information;

creating, using the at least one computer, the third access right of the workspace file management information based on the first access right of the file management information, the second access right of the workspace access right information and the workspace file utilization information;

when the user accesses the file via the workspace, processing, using the at least one computer, a second access to the workspace based on the second access right of the workspace access right information;

identifying, using the at least one computer, the third access right of the user to the file on the workspace based on the workspace file management information;

switching, using the at least one computer, the second access right of the user to the identified third access right; and processing, using the at least one computer, an access to the file on the workspace by the identified third access right.

6. The access control method according to claim 5, further comprising steps of:

segmentalizing, using the at least one computer, the file into a plurality of structuring units;

updating, using the at least one computer, the file for each of the structuring units, forming, using the at least one computer, a temporary copy of the file that is a target of an update request if another user is updating the file, updating, using the at least one computer, the temporary copy according to the update request, detecting, using the at least one computer, the structuring unit that was updated after the update of the temporary copy is completed, and updating, using the at least one computer, the structuring units of the file that were updated for each of the structuring units.

7. The access control method according to claim 5, further comprising a step of:

updating, using the at least one computer, only the structuring units of the file that were updated that was segmentalized into a plurality of structuring units according to an update request of the file if another user is updating the file.

8. The access control method according to claim 7, further comprising steps of:

forming, using the at least one computer, a temporary copy of the file that is a target of an update request if another user is updating the file, updating, using the at least one computer, the temporary copy according to the update request, detecting, using the at least one computer, the structuring unit that was updated after the update of the temporary copy is complete, and updating, using the at least one computer, each of the structuring units that were updated.

* * * * *